US005454038A

United States Patent [19]

Cordery et al.

[11] Patent Number: 5,454,038

[45] Date of Patent: Sep. 26, 1995

[54] ELECTRONIC DATA INTERCHANGE POSTAGE EVIDENCING SYSTEM

[75] Inventors: Robert A. Cordery, Danbury; Steven J. Pauly, New Milford; Leon A. Pintsov, West Hartford, all of Conn.

[73] Assignee: Pitney Bowes Inc., Stamford, Conn.

[21] Appl. No.: 161,560

[22] Filed: Dec. 6, 1993

[51] Int. Cl.$^6$ .......... H04L 9/32

[52] U.S. Cl. .......... 380/23; 380/25; 380/51

[58] Field of Search .......... 380/23, 51, 25

[56] References Cited

U.S. PATENT DOCUMENTS

| | | | |
|---|---|---|---|
| 4,725,718 | 2/1988 | Sansone et al. | 235/495 |
| 4,757,537 | 7/1988 | Edelmann et al. | 380/51 |
| 4,775,246 | 10/1988 | Edelmann et al. | 380/23 |
| 4,831,555 | 5/1989 | Sansone et al. | 364/519 |
| 4,873,645 | 10/1989 | Hunter et al. | 364/479 |
| 4,934,846 | 6/1990 | Gilham | 400/104 |
| 4,965,827 | 10/1990 | McDonald | 380/25 |
| 5,189,700 | 2/1993 | Blandford | 380/23 |
| 5,224,166 | 6/1993 | Hartman, Jr. | 380/50 |
| 5,233,657 | 8/1993 | Gunther | 380/23 |
| 5,319,562 | 6/1994 | Whitehouse . | |

FOREIGN PATENT DOCUMENTS

| | | | |
|---|---|---|---|
| 2657985 | 2/1993 | France | G07B/17/04 |
| 2271452 | 4/1994 | United Kingdom | B07C/3/18 |

*Primary Examiner*—Salvatore Cangialosi
*Attorney, Agent, or Firm*—Charles R. Malandra, Jr.; Melvin J. Scolnick

[57] ABSTRACT

Methods and systems for preparing mailpieces involve the creation of mailing lists which includes correct and incorrect recipient address information. The list is transmitted to a data center. Received from the data center is a mailing list including addressed hygiened recipient address information and a digital token for each mailpiece with encrypted data. The encrypted data is based on the corrected address information for mailpieces with correct address information on the transmitted mailing list and on hygiened recipient address information the mailpieces with incorrect recipient address information on the transmitted mailing list. The digital tokens for each mailpiece may also be based on the rating parameter information.

Selection is provided for utilizing a given one of the incorrect recipient address information and the correct recipient address information is applied to an encrypter generating the digital tokens. The encrypting means for generating digital tokens may be located remote from the mailer facility or on a mailer facility or other local area network. Various arrangements are employed in generating and printing digital tokens recipient address information and corrected recipient address information.

23 Claims, 15 Drawing Sheets

MAILER POSTAGE REQUEST GENERATION

DATA CENTER POSTAGE REQUEST PROCESSING

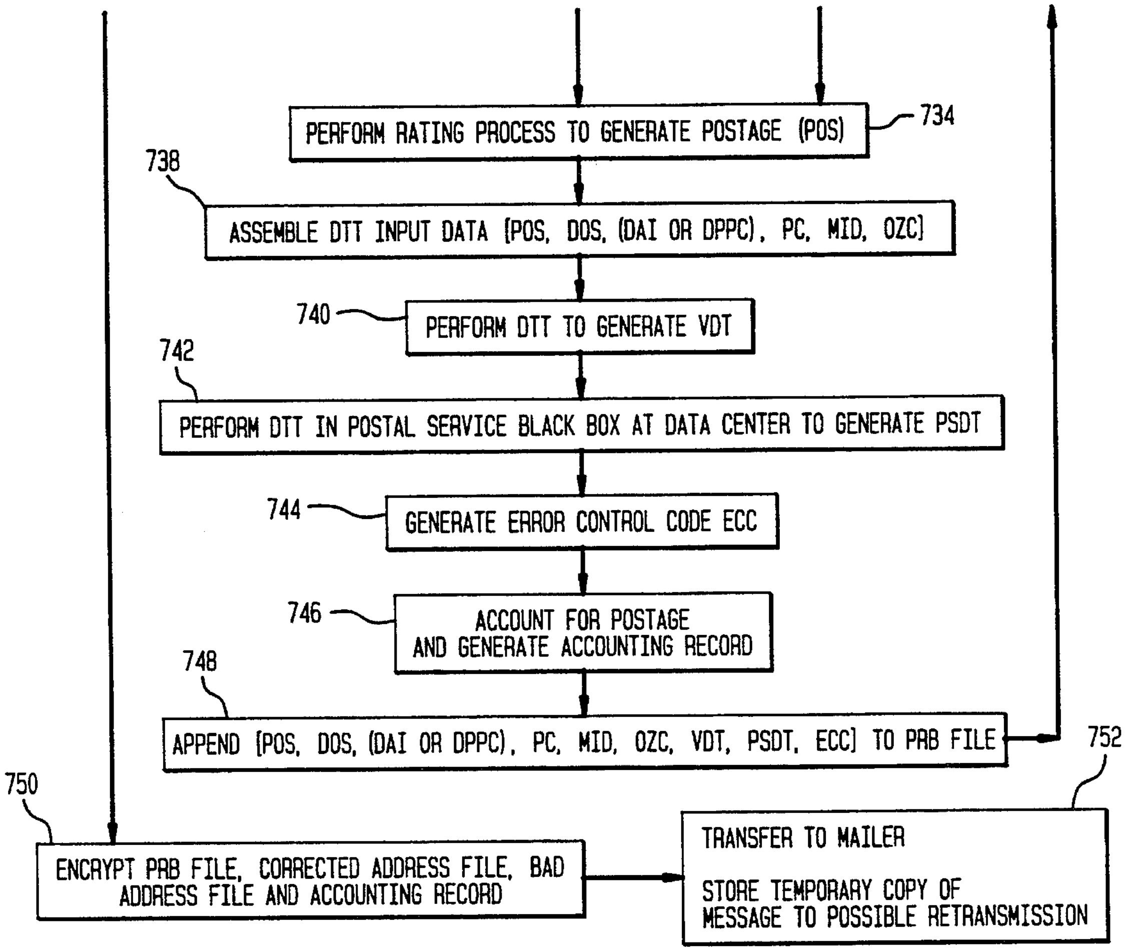
FIG. 7B
FIG. 7
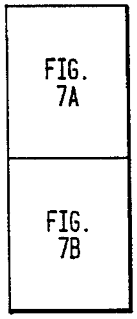

VERIFICATION PROCESS

NETWORK PED SYSTEM POSTAGE REQUEST PROCESSING

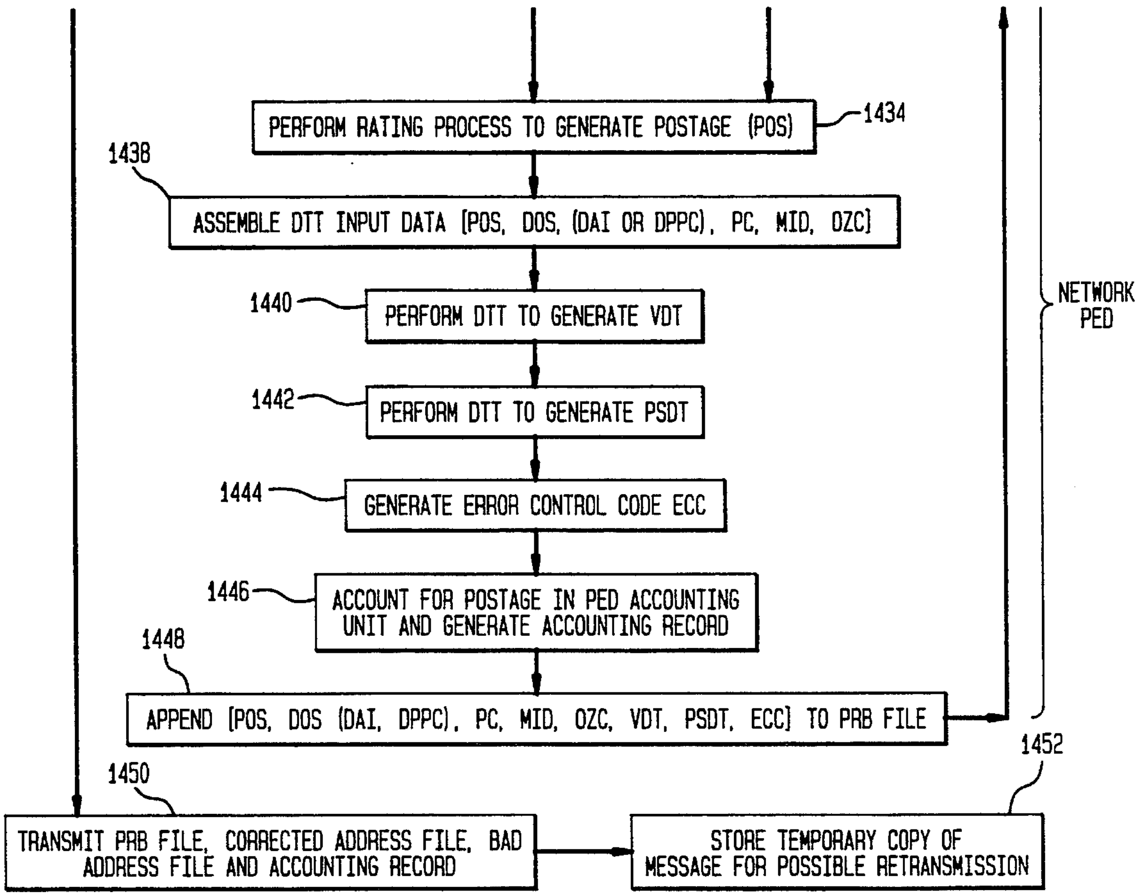
FIG. 14B
FIG. 14
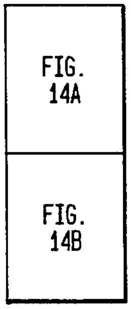

ELECTRONIC DATA INTERCHANGE POSTAGE EVIDENCING SYSTEM

FIELD OF THE INVENTION

The present invention relates to value metering systems employing electronic data interchange and, more particularly to a postage evidencing system employing electronic data interchange.

BACKGROUND OF THE INVENTION

Postage metering systems have been developed which employ encrypted information printed on a mailpiece. The postage value for a mailpiece may be encrypted together with other data to generate a digital token. A digital token is encrypted information that authenticates the information imprinted on a mailpiece including postal value. Examples of systems for generating and using digital tokens are described in U.S. Pat. No. 4,757,537 for SYSTEM FOR DETECTING UNACCOUNTED FOR PRINTING IN A VALUE PRINTING SYSTEM; U.S. Pat. No. 4,831,555 for UNSECURED POSTAGE APPLYING SYSTEM; U.S. Pat. No. 4,775,246 for SYSTEM FOR DETECTING UNACCOUNTED FOR PRINTING IN A VALUE PRINTING SYSTEM; U.S. Pat. No. 4,873,645 for SECURE POSTAGE DISPENSING SYSTEM; and, U.S. Pat. No. 4,725,718 for POSTAGE AND MAILING INFORMATION APPLYING SYSTEM. The entire disclosure of these five patents is hereby incorporated by reference.

As a result of the digital token incorporating encrypted value, such as postage value, altering the printed information in a Postal Revenue Block is detectable by standard verification procedures.

It has been recognized that to underpay postage, an attempt may be made to interfere with the rating process (as opposed to the resulting printed postage value). Systems have been developed to protect against such attempts by the use of hash values and encrypted hash values of various rating parameters and rate tables such as is disclosed in U.S. patent application Ser. No. 133,398 filed Oct. 8, 1993, for POSTAL RATING SYSTEM WITH VERIFIABLE INTEGRITY by Leon A. Pintsov, Richard A. Connell, Ronald P. Sansone, and Alfred C. Schmidt, and assigned to Pitney Bowes Inc.

In U.S. Pat. No. 4,873,645 for SECURE POSTAGE DISPENSING SYSTEM and U.S. Pat. No. 4,725,718 for POSTAGE AND MAILING INFORMATION APPLYING SYSTEM, as well as published French Patent Application 90 01284 (Publication No. 2 657 985 for PROCESS AND INSTALLATION FOR CONTROLLING THE COMPUTERIZED POSTAL METERING OF LETTERS; it has been disclosed that addressee information can be beneficially utilized as part of the encryption process to provide enhanced security against counterfeiting of the printed digital token since the encrypted information is unique to each address.

SUMMARY OF THE INVENTION

It has been discovered that a value metering system can be provided which employs encryption but has a greater security than heretofore obtainable by prior systems.

It has been further discovered that it is possible to provide a digital token for use in imprinting on a mailpiece or other item where neither the secret key nor a secret algorithm is available at the mailer printing device or at the mailers site.

It has been further discovered that a large number of mailers can be supported in an encryption system with enhanced key management in a simple and effective manner.

The present invention further facilitates the utilization of address information which may or may not be subject to address hygiene at either the mailer's location or a remote location or on a network.

In accordance with the present invention, methods and systems for preparing mailpieces are employed. A mail list is created including mailpiece recipient address information for each mailpiece. The mailing lists includes correct recipient address information and incorrect recipient address information. The mailing list is transmitted to a data center. Received from the data center is a mailing list including hygiened recipient address information for mailpieces in the transmitted mailing list with incorrect recipient address information. Additionally received are digital tokens for each mailpiece. Each of the digital tokens includes encrypted information for each mailpiece based on the correct address information for mailpieces with correct address information on the transmitted mailing list and on hygiened recipient address information for mailpieces with incorrect recipient address information on the transmitted mailing list.

In accordance with a feature of the present invention, rating parameter information is determined for each mailpiece. The rating parameter information constitutes the basis upon which the charges for mailpiece delivery is calculated. The rating parameter information is transmitted to the data center and the received digital token for each mailpiece are based, in addition to the recipient address information on the rating parameter information.

In accordance with another feature of the present invention, recipient address information is generated for mailpieces. The recipient address information includes correct and incorrect recipient information. Correct recipient information is generated for incorrect recipient information and a selected one of the incorrect recipient address information and the corrected recipient address information is applied to an encrypter. The encrypter generates encrypted data based on the selected one of the incorrect recipient address information and the correct recipient address information. The encrypted data then may be placed on the mailpiece.

In accordance with another feature of the present invention, recipient address information is communicated from the mailers facility to a means for encrypting. The means for encrypting is located remote from the mailer facility and contains encryption algorithm information. Encrypted data is generated by the remote encryption means based on the communicated recipient information and the encryption algorithm information. The encrypted data is transmitted from the remote encryption means to the mailer facility. The mailer facility does not have access to the encryption algorithm information.

In accordance with another feature of the present invention the encryption algorithm noted above may or may not be known; however, secret encryption key information is incorporated in the remote encryption means and the mailer facility does not have access to this secret encryption key information.

In accordance with another feature of the present invention, a digital token may be generated based on both recipient address information and corrected recipient address information. The digital token is imprinted on the mailpiece such that a relationship exists between the selected one of the recipient address information and the corrected recipient address information and the printed digital token.

In accordance with another feature of the present invention, both digital tokens may be printed on the mailpiece along with the selected one of the recipient address information and the corrected recipient address information.

In accordance with another feature of the present invention, recipient address information may be communicated from a first location at a mailers facility over a local area network to means for encrypting at a second location at the mailer facility. The encrypting means is protected by a tamper resistant housing and coupled to the local area network. The encrypting means contains encryption algorithm information. The encryption means generates encrypted data based on the communicated recipient information and the encryption algorithm information. The encrypted data is transmitted from the encryption means over the local area network to the mailer facility first location. If desired the encrypted data may be placed on the mailpiece at the mailer facility.

In still another feature of the present invention, the encryption algorithm information may or may not be a publicly known encryption algorithm; however, the means for encryption contains secret encryption key information.

BRIEF SUMMARY OF THE DRAWINGS

Reference is now made to the following FIGUREs wherein like reference numerals designate similar elements in the various views, and in which.

DETAILED DESCRIPTION OF THE PREFERRED EMBODIMENT

Figure 1:
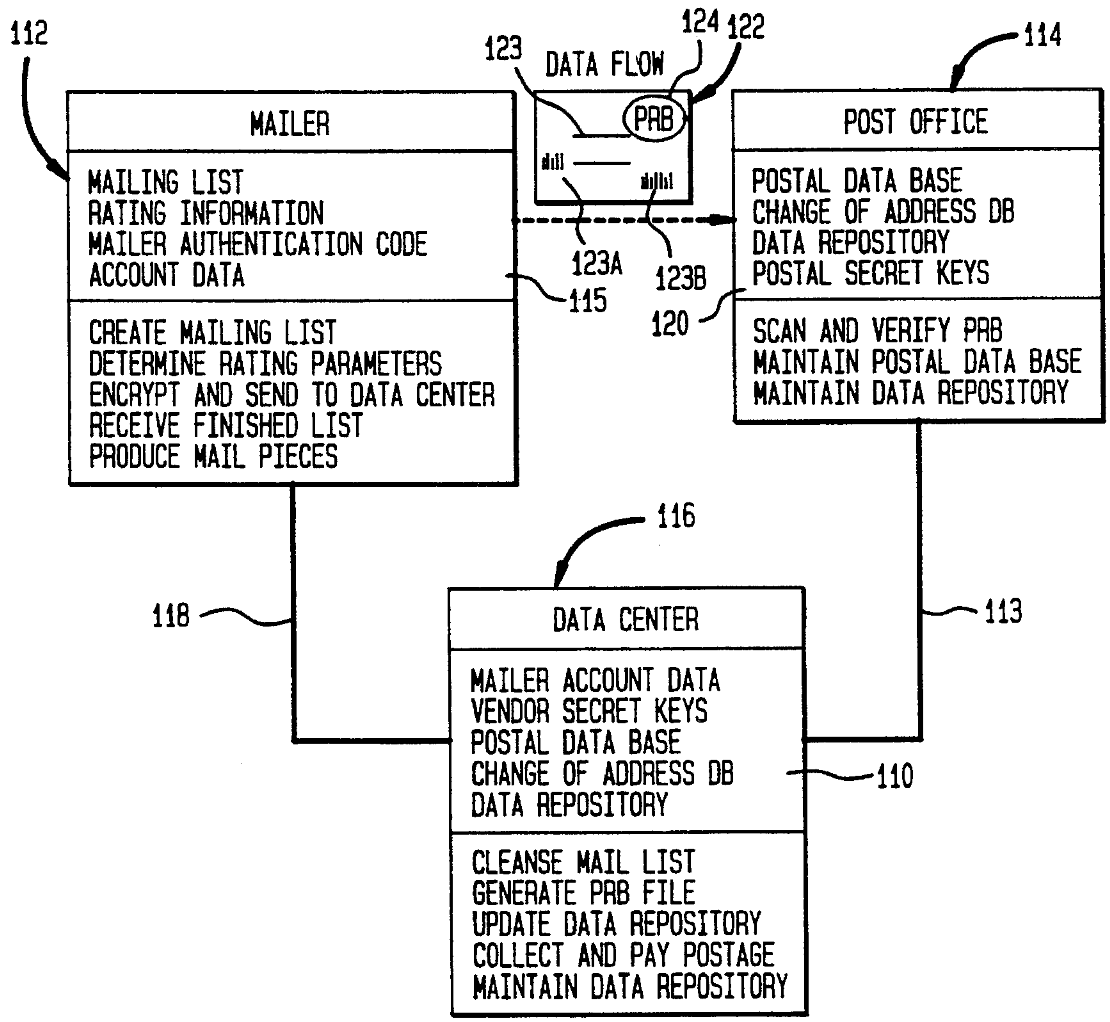
FIG. 1 is a block diagram of a postage evidencing system architecture embodying the present invention.

Reference is now made to FIG. 1. A mailer unit shown generally at 112 is utilized to generate mailpieces including suitable postage revenue blocks including necessary information to mail the letters to various addresses. The mailer unit 112 includes data necessary to process mail including mailing list information, rating information, mailer authentication code information and account data information which is stored in a storage device 115. The mailer unit functions to create a mailing list, determine rating parameters which are used to establish the postal value to be imprinted on a mailpiece and encrypt and send to a data center the necessary information via electronic data interchange over communication link 118. The mailer unit also receives the processed information necessary to prepare mailpieces and produces the mailpiece for dispatch into the mail stream.

The mailing list includes recipient address information. This recipient address information may include both correct and incorrect information. The nature of the incorrect information may be incomplete or inaccurate addressee data. For example, as noted below address hygiene may be employed. In such case, a determination that the address on the mailing list does not correspond to an address in the hygiene data base, the recipient addressee information would be deemed incorrect. These databases include a compilation of all address for a given region, area or even an entire country. The United States Postal Service National Address Database is one example of this type of database. It should be recognized that in many instances incorrect address information does not render a mailpiece undeliverable as addressed. For example, a street name may be misspelled or a zip code may be omitted or a "vanity" name or abbreviation may be used for a city.

Communication is encrypted to prevent eavesdropping on the communication link. A shared piece of secret data such as the mailer authentication code may be communicated in encrypted form to verify the authenticity of the mailer and likewise to verify the authenticity of the data center shown generally at 116. It should be expressly recognized that many variations of the communications system and data flow can be established. For example, the carrier may establish a private Electronic Data Interchange standard or may work through the ANSI X.12 or EDIFACT standards committees. Moreover, various communications means could be employed including dial up modems, packet switched networks or interactive television networks.

It should also be recognized that the communications system may employ paper based transactions. For example, the mailer may provide a printed mail list to the data center for processing and the data center may provide printed labels containing valid Postal Revenue blocks.

The data center 116 stores mailer account data, vendor secret keys for generating digital tokens and also a postal data base, which is a data base of valid addresses utilized in address hygiene activity. A change of address data base may also be included to correct address changes which may not be known to the mailer unit 112 as well as a data repository.

The data repository is provided at the data center to store statistical data concerning the mailer, such as total postage utilized, piece count of mail items, groupings of letters sent to various zip codes, classes of mail service utilized and other useful data. This information is stored in a memory storage device 110 located at the data center. The data center provides the functionality of cleansing the mail list (address hygiene) and generating a postal revenue block (PRB) file. The PRB represents the information to be printed as the postal revenue block on each mailpiece by the mailer unit 112. It updates the data repository stored in the storage device 110 as additional data is received from the mailer unit 112 and transmitted back to the mailer unit. The data center 116 further functions to collect funds and pay postage and to maintain the updated data repository for later utilization.

The data center 116 is in communication via electronic data interchange (EDI) communication link 113. Similar to communication over the EDI link 118 between the mailer unit 112 and the data center 116, secrecy and authenticity techniques may be implemented. In the case of the mailer unit 112 and the data center 116 the shared secret data may be a mailer authentication code which is stored in the data center as part of the mailer account data. The shared information between the data center 116 and the postal office data center 114 may be a vendor authentication code which would be stored as part of the data repository at the data center and also as part of the data repository at the post office 114.

At the post office 114, a postal data base is maintained as is address and a change of address data base. Additionally, a data repository and postal secret keys are stored. This information is stored in a storage device 120. The post office 114 functions to scan and verify the postage revenue block 122 of mailpiece 124 which is physically transmitted from the mailer unit to the post office or to another verifying facility which, for example, may be a contracted facility. Alternatively, postal revenue blocks may be inspected in the field by postal or other inspectors employing suitable equipment. The post office 114 also maintains and updates the data base of addresses and maintains and updates the data repository. The detailed operation of each of these facilities, the mailer unit 112 the data center 116 and the post office 114 is described in detail in connection with both the diagrammatic representation of each of these facilities and their accompanying flow charts.

The postal revenue block 124 as well as the imprinted recipient address information 123 may be printed in machine readable form. This may be as shown at 123A as part of the imprinted recipient address information block on the mailpiece 122 or at any selected separate location on the mailpiece (which may be as part of the postal revenue block 124 or elsewhere as shown 123B). The particular and machine readable imprint of the postal revenue block 124 and/or recipient address information 123 is shown as imprinted in bar, half bar code. Other machine readable alpha numeric fonts are suitable for imprinting on the mailpiece 122.

Figure 2:
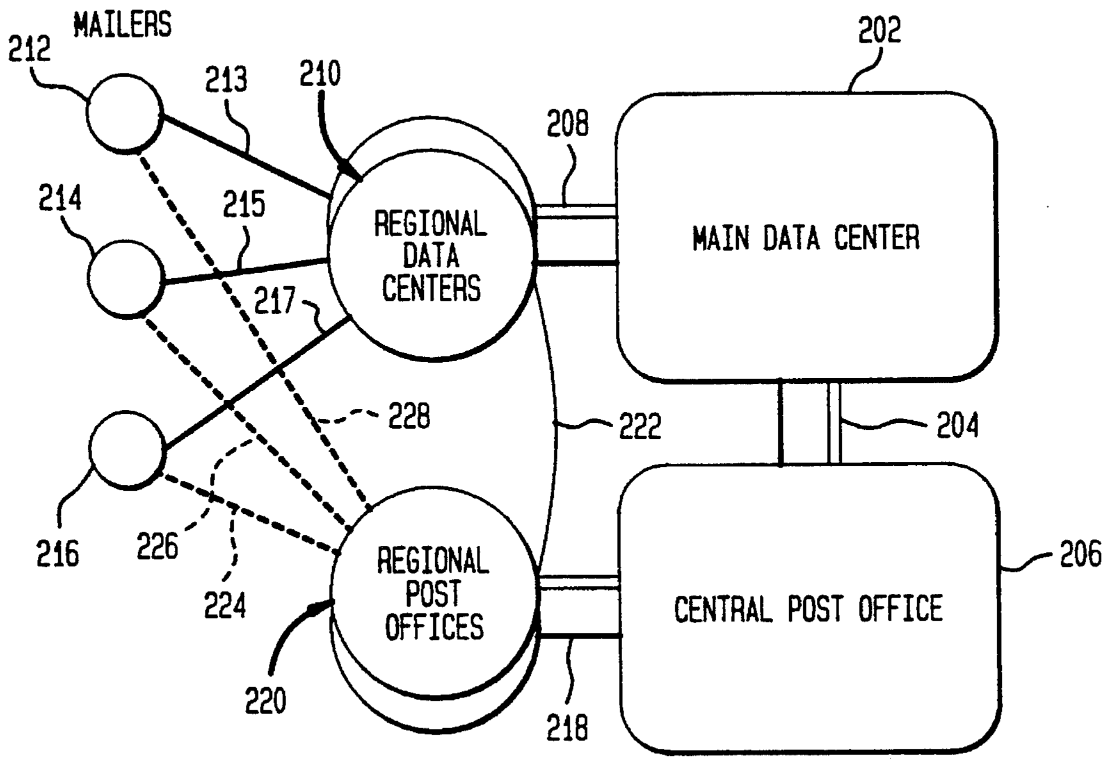
FIG. 2 is a block diagram of a communications arrangement involving a data center, a central post office and regional data centers and post offices suitable for use with the architecture disclosed in FIG. 1.

Reference is now made to FIG. 2. The main data center of the vendor 202 is connected via a communication link 204 to the central post office 206. The main vendor data center 202 is also connected through communication links 208 to various regional data centers shown generally at 210. The regional data centers 210 are connected in turn to various mailers shown at 212, 214 and 216. The central post office 206, similar to the main data center of the vendor 202, is connected via communication links to regional post offices shown generally at 220. It should be noted that the regional data center 220 may be in communication via a data link 222 to the regional post offices 210 and the various mailers 212, 214 and 216. Physically transmission of mailpieces to the regional post offices 220 as is shown by the dashed lines 224, 226 and 228. The mailers 212, 214 and 216 are in communication with the regional data centers via communication links 213, 215 and 217.

It should be expressly recognized that many variations of the communications system and data flows can be established. For example, the mailers 212, 214 and 216 can send their mailpieces directly to the central post office 206. Moreover, the mailers can be in direct communication with the main data center 202. Other combinations and variations are possible depending on the needs of the particular postal environment involved.

Figure 3:
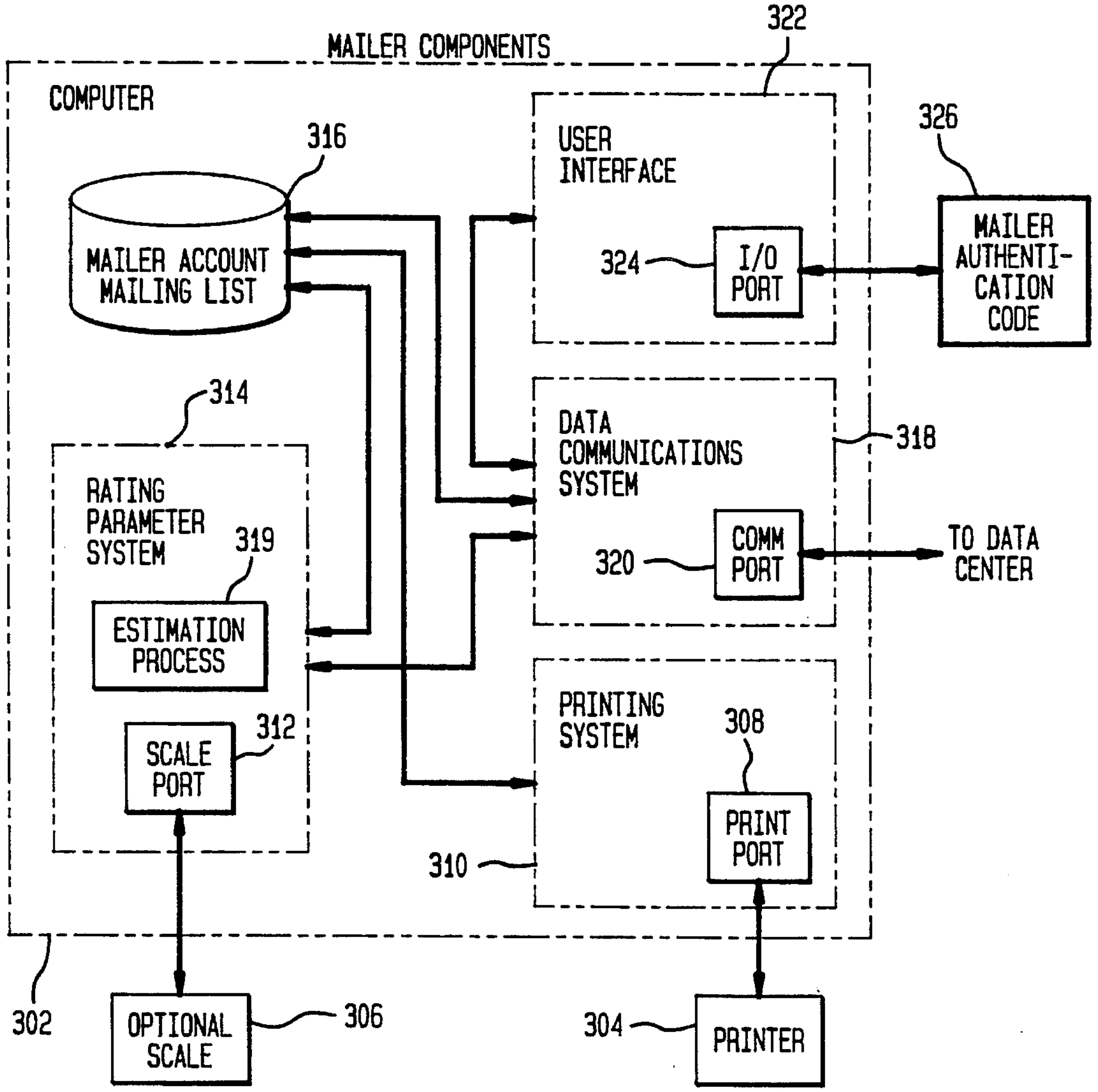
FIG. 3 is a diagrammatic representation of the mailer unit postage evidencing system.

Reference is now made to FIG. 3. The mailer unit shown generally at 302 includes a printer 304 and optionally a scale 306. The printer 304 is connected through a print communication port 308 to the printing control system 310. Printing control system is adapted to control the operation of the printer 304. The optional scale 306 is connected to a scale port 312 of the rating parameter system 314. This system 314 provides the ability to rate the mailpieces based on actual rate and/or other rating parameters measurable by the scale 306 and or associated apparatus.

Alternatively, for a mailing to be implemented, the rating parameter system 314 can, based on various information in the mailer unit computer storage 316, determine the rating parameters to be utilized through a rating process 319. This is based on information stored on the rating parameter system 314. The mailing unit storage device 316 is in communications with a data communications system 318 to enable communications with a remote data center to be hereinafter described. A data communications system 318 includes a communication port 320 to facilitate the communications. A user interface 322 can be by means of I/O a communication input/output (I/O) port 324, or by a keyboard and display, by other I/O type devices or by means of a smart card or magnetic card. A secret mailer authentication code is stored in a secure tamper resistant device 326. The authorization code can alternatively be secret information known to the mailer and hand keyed into the system using the user interface 322. The authorization code is then passed to the data communications system 318 to initiate a mail run in accordance with the flow chart described hereinafter.

The mailer authentication code is not part of the security of the mailing process but is part of the shared information communicated over the EDI channel 118 of FIG. 1 between the mailer 112 and the data center 116. The mailer authentication code provides for mutual security and authentication for the mailer and the data center. It is not related to security of the postal funds or to the information imprinted on each mailpiece. Mailer account data received from the data center and stored in the storage device 316 can be sent to the printing control system for generation of incoming reports.

The printer 304 and the printing subsystem 310 as well as other areas of the mailer unit 310 and other portions of the system outside of the mailer unit may be monitored to ensure proper operation. Specifically, as an example, if the printer 304 should not properly print digital tokens (the postal revenue block 124 on mailpiece 122 this information is detected and stored in the mailer unit for communication to the data center to enable credit to be provided to the mailers account, and/or to initiate an inspection if warranted based on the number of digital tokens that are not properly printed. The failure to print the digital token by printer 304 may be due to a failure of the printer, and a failure in the communications channel, or a specific determination on the part of the mailer not to prepare the particular mailpiece. In any event, once the digital token, as will be recognized hereafter, has been issued by the data center to the mailer, the mailers account may be charged for such digital token and audit of receipt and use of the digital token is required for the mailer to ensure that no charge is incurred for a digital token not utilized, unless such arrangement is part of the system and understanding between the mailer and the carrier involved.

Figure 4:
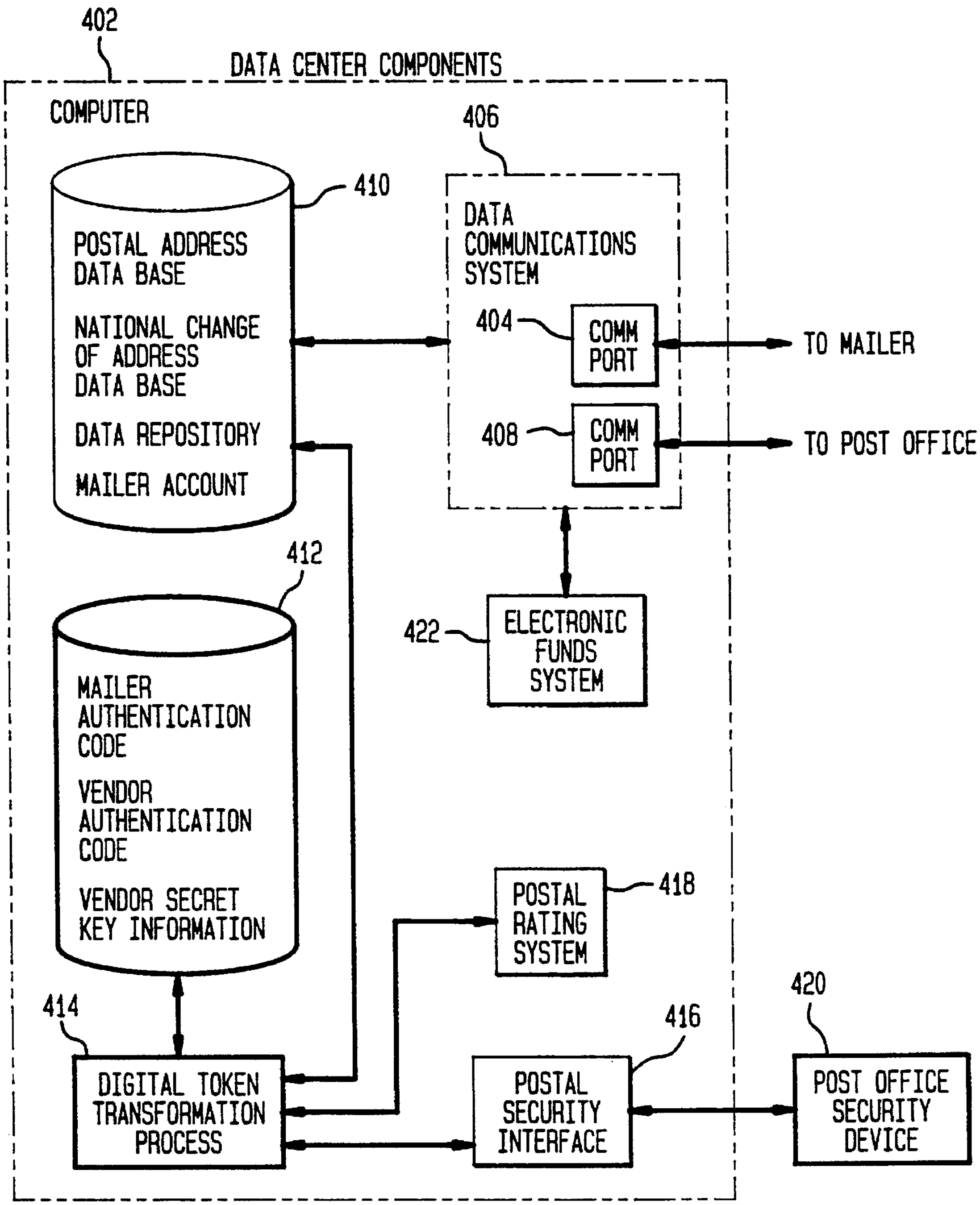
FIG. 4 is a diagrammatic representation of a data center adapted to interact with the mailer unit shown in FIG. 3.

Reference is now made to FIG. 4. The mailer unit communicates to the data center shown generally at 402 via a data center communications port 404 which is part of the data communications system 406. The data communications system 406 further includes a data communications port 408 adapted to interface to the Post Office.

The data communications system 406 is connected to a data storage device 410 which includes various information in addition to information received from the mailer. Included in the storage device 410 are: postal address database; a national change of address database; a data repository which would include information transmitted by the mailer; and, mailer account information which also would include information transmitted by the mailer. The data repository and mailer account information may include accumulated data and other data stored by the data center relevant to various transactions associated with the mailer.

A secure tamper resistant memory 412 is provided at the data center. The data center secure memory 412 may be a part of the memory 410 or a separate independent memory system. The memory 412 stores various information which need to be maintained secure, including the vendor authentication code, the mailers authentication codes, the vendor secret key information, if desired, and the digital token transformation algorithm. The data from the memory 412, appropriate data from memory 410, data received from the mailer via data communications system 406, along with data from the postal rating system 418, are processed in a digital token transformation device 414 to produce the vendor digital token. For maximum security the Post Office digital token is produced by a digital token transformation performed securely within the Post Office security device 420. The digital tokens authenticate a mailpiece and the postage value imprinted on said mailpiece. The data used to produce the vendor digital token is also used to produce the Post Office digital token. Said data is transmitted to the Post Office security device 420 via the Postal security interface 416. The Post Office security device produces the Post Office digital tokens via a digital token transformation and returns them to the data center via the postal security interface. The Post Office security device may be located in the data center and it contains the Post Office secret keys that are assigned by the Post Office to the data center for production of digital tokens. Alternatively, the Post Office secret keys may be stored in the data center secure storage device 412 and the Post Office digital token transformation may be performed in the digital token transformation device 414. In this case the security of the system is reduced, because the vendor and Post Office secret information is not kept separate.

The payment for postage is transferred from the mailers account to the postal service at the data center electronic funds system 422.

The Post Office security device 420 has the post office secret key information which is used by the digital token transformation process 414 to generate post office digital tokens. These post office digital tokens are also transmitted (along with the vendor digital tokens) to the mailer via communication port 404. The operation of the data center components are described in greater detail in connection with the associated flow chart.

Figure 5:
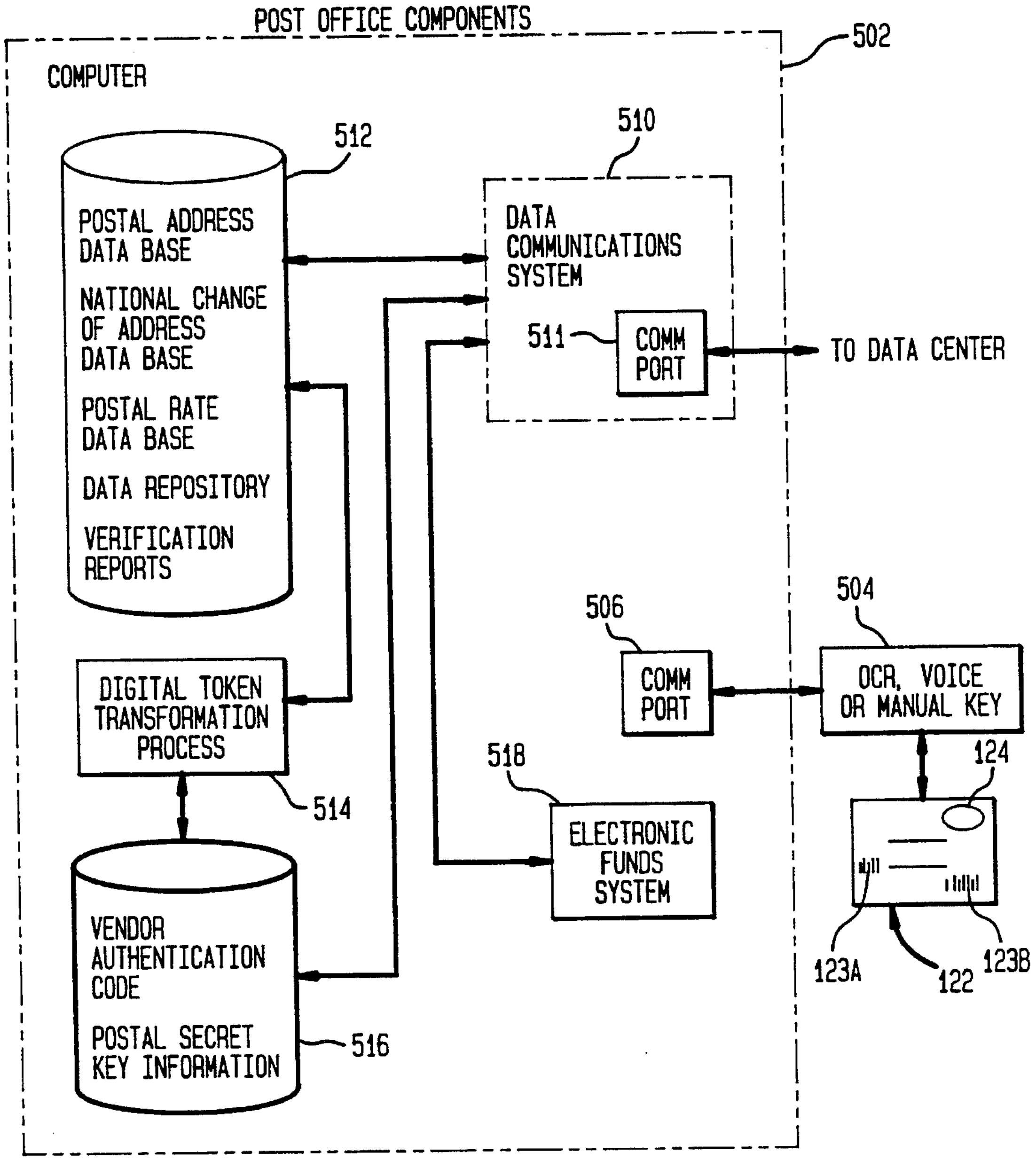
FIG. 5 is a diagrammatic representation of a carrier verification system adapted to verify postage payment evidenced in accordance with the present invention.

Reference is now made to FIG. 5. A Post Office shown generally at 502 receives physical delivery of various mailpieces 122, each including both digital tokens printed in the postal revenue block 124. The information from the mailpiece 122 is obtained at device 504 by OCR recognition, voice input or manual key entry by a Post Office employee or by other suitable manner such as video lift image technology.

The information from the device 504 is communicated through a communication port 506 which is part of the data communications system 510. The information capturing device 504 is utilized in conjunction with information stored in a post office data storage device 512 to verify the postal revenue block 124 by utilization of the Digital Token Transformation process 514. The postal secret key information and other relevant secret postal information may be stored in a secure tamper resistant storage device 516. The vendor authentication codes are also stored in the secure storage device 516.

The storage device 512 includes: postal address database; national change of address database; postal rate database; data repository; and, verification reports. Other suitable information may be stored in this memory. An electronic funds system 518 is provided to receive funds from the data center via the data communication system 510 as part of an electronic funds transfer system. It should be noted that various suitable funds transfer system may be employed as part of the present invention.

The data center 402 may communicate to the Post Office 502 both data repository information and verification report information to allow the Post Office 502 to be periodically updated as to this information. Similarly, the post office 502 may periodically update the data center, 402.

It should be expressly noted that the system described is a system where secure postal key and secure vendor key and secure postal algorithm and secure vendor algorithm information may all be employed, and not stored at the mailer unit site 302. This provides greatly enhanced security because access to information which could allow the fraudulent generation of digital tokens is completely. While the mailers may be hundreds and thousands in number, the number of vendors and the number of post office data centers requiring this information is limited in number allowing a much higher security and control to exist for this critical data.

Figure 6:
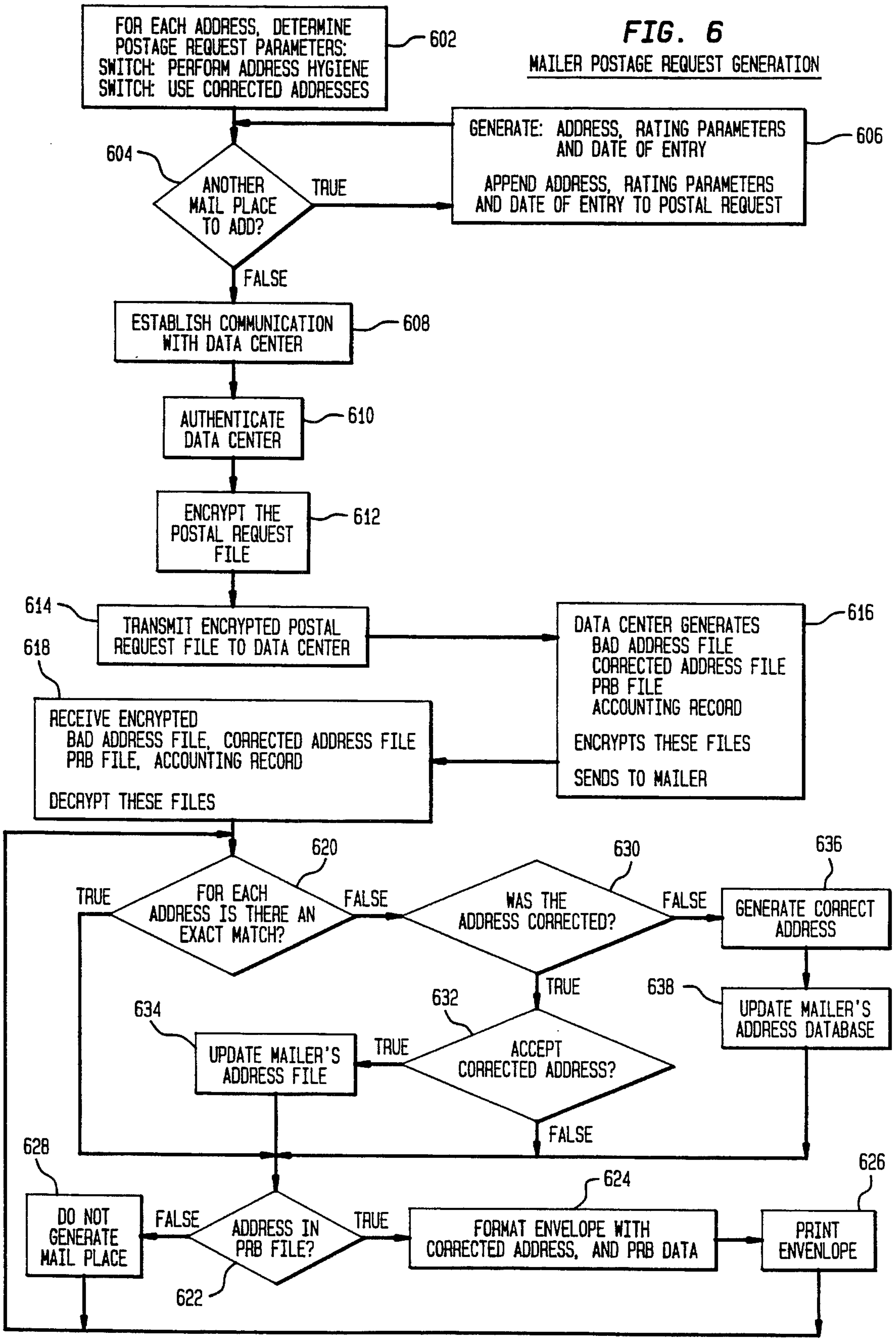
FIG. 6 is flow chart of the operation of the mailer unit shown in FIG. 3.

Reference is now made to FIG. 6 which is the flow chart of the operation of the mailer unit shown in FIG. 3. And, more particularly, the process wherein the mailer postage request is initiated and the Digital Tokens received and utilized in printing the postage revenue block.

At 602 a determined postage request is initiated and certain particular parameters associated with the process are either switched to an active or inactive state. Specifically, at 602 a determination is made by the user whether address hygiene is to be performed. The address information may not be susceptible to address hygiene due to either a lack of appropriate address information or due to mailer's desire to keep due address information in its original uncorrected form. If the address hygiene parameter switch is actuated, a further parameter switch is available to determine whether the system is to use any corrected hygiened address (that is a changed address) as opposed to the original address in generating the digital token to be imprinted on the mailpiece.

This parameter switch is utilized so that a user has the option of using the uncorrected address for a particular mailpiece but still be advised of the fact that the address hygiened data base carries with it a different hygiened address.

This is a very essential feature for a mailer to be able to determine which address is utilized in generating the digital token. Assurance must be had that the digital token generated with the address information corresponds with the address printed on the envelopes. Thus, if the hygiened address is to be printed on the envelope the corrected address would be used in the generation of the digital token. On the other hand, if the uncorrected address is utilized then the uncorrected address is also utilized in generating the digital token. This allows later verification from the mailpiece itself. Moreover, from time to time address hygiened data bases themselves have incorrect information such that the hygiened address could change a correct address to an incorrect address. Thus, this option is needed at least for this purpose. Address hygiene may involve multiple communications between the mailer and the address hygiene data base. If the data base is located remotely and communication costs are involved, it may be desirable to automate the use of the particular address (corrected or uncorrected hygiened address) determined on the number of times communications are necessary to correct the address. Thus, if a corrected address comes back in a first communication pass this address may be used while if the first communication pass results in a request for further information from the user to enable address hygiene to proceed, the uncorrected address will be utilized in generating Digital Tokens. This allows the mailer to generate all of the Digital Tokens for a large number of mailpieces which may be processed in a single time in one communication pass without the necessity to delay processing of the entire group of mailpieces until multiple communications with the address hygiened data base is completed or alternatively to defer the processing of the particular mailpieces requiring multiple communications.

Alternatively, uncorrected address can be outsorted from a mail run so that all uncorrected addressed mail can be later processed, possibly as a separate batch with or without address correction.

For those rating systems that provide a discount for hygiened addresses, it may be necessary for those unhygiened addresses (where uncorrected addresses or incomplete addresses are utilized) to pay an additional postage amount. Thus, the system must provide postage value to be imprinted by hygiened and unhygiened address as appropriate. An example, of an unhygiened address in the United States is where certain "vanity" names are used as opposed to standard names stored in the postal address data base.

In areas where uncorrected addresses are utilized, it may be desirable to utilize an address identifier. This is a delivery address identifier to provide a unique addressee number associated with a particular mailpiece (this may also be utilized in connection with hygiened addresses) which can be a numeric or alphanumeric string associated with the address. The string is derived algorithmically from the data in the delivery address block. It should be such that it is difficult to produce two different address blocks that have the same delivery address identifier. A Delivery Point Postal Code (such as a zip code in the United States which may involve up to 11 digits) is an example of a delivery address identifier.

At 604 a determination is made if there is another mailpiece for which a postage request is required. If this is true (as it would be for the first postage request received) the mailer at 606 generates the address for the mailpiece (which may be hygiened or unhygiened) and the various rating parameters as well as the date of entry into the mailstream (the date in which the mail will be deposited with the carrier). Other dates of entry can be used depending upon the nature of the system involved such as the date of creation of the mailpiece. The rating parameters can vary depending upon the particular rating system associated with the carrier involved. The rating systems vary from carrier to carrier, as for example the United States Postal Service, United Parcel Service, Federal Express, United Kingdom Royal Mail, etc. These services have various rating parameters utilized to determine the appropriate price for a delivery of a particular mailpiece (which for the purpose of the present invention and disclosure is intended to include parcels). At 606 the processing of a particular mailpiece is activated by generating various information elements that may include the address, rating parameters, date of entry. This may be appended to a postal request file which is being generated as various mailpieces loop through decision block 604 and are processed at 606. Where no further mailpieces are to be processed as determined at 604, communications is established with a remote data center at 608.

A procedure is initiated and completed at 610 to authenticate the data center in a known manner such that the mailer is assured that communication has been established with an authorized data center to issue the digital tokens to be printed on the mailpieces. Once this has been established, the postal request file may be encrypted at 612 and the encrypted postal data file transmitted at 614 to the data center. The data center at 616 performs its process on the transmitted encrypted postal request file as shown in detail in FIG. 7. This process at the data center which is shown in abbreviated form at block 616 and involves: generating (if a hygiened request has been made) a bad address file; a corrected address file; a postal revenue block file (with a postal revenue block associated with each of the plurality of mailpieces involved in the transmitted encrypted postal request file); and, an accounting record of the transaction which debits funds associated with the mailer's account for the digital tokens to be transmitted to the mailer. At 616 the data center encrypts (some or all) of the above noted files, namely, the bad address file, corrected address file, postage revenue block file and accounting record, and sends these files or portions thereof to the mailer.

At 618 the mailer receives the encrypted files transmitted by the data center and decrypts these files or portions thereof depending upon the particular system implemented and the nature of the data transmitted. For each address for a given postal request file that has been transmitted, processed and received back, if for such item there is an exact match as to the address at 620, a determination is made at 622 whether this address is in the postal revenue block file. In such case, the data is formatted at 624 and an envelope is printed at 626 with the postal revenue block. Other appropriate data may also be printed at 626 such as the address, barcode, return address and advertising slogan, unique identifiers associated with advertising material or surveys, service codes and the like.

If on the other hand the address is not in the postal revenue block file, for whatever reason, which would most likely be an error condition, the mailpiece is not generated at 628. The process loops back to decision block 620 and continues as to the next mailpiece.

The error condition noted above at 628 is only one example of many error conditions that can exist throughout the system which would require corrective action. Another example is the postage revenue block file being out of synchronism with the postal request file. This could have occurred because of a processing error or a communication error or a component failure. Other errors can occur throughout the system which will require similar type corrective action as noted in block 628, or if needed or desired, to completely halt the process, to resynchronize the relationship of the various data files, and/or to reinitiate the process from the beginning. Because of the fact that funds may be accounted for where printing has not taken place, it is important that this information be communicated back to the data center 402 to allow either an electronic or physical audit to be conducted to determine the nature and extent of the error for which refunded postage may be requested.

If at 620 if there is no exact match for the particular mailpiece from the decrypted postal request file with the address in the mailers generated postal request file transmitted to the data center, a determination is made at 630 if the address was corrected. If the address was corrected a further determination is made at 632 whether to accept the corrected address and if so the mailers address data base is updated at 634 and the process continues to decision block 622 as previously noted.

If on the other hand the address was not corrected as determined at 630, the correct current address is generated at 636 if possible. This may be a manual update or loading in of new address from another source. The inability to correct a bad address will flow through, to block 628 and result in not generating the particular mailpiece. At 638 the corrected address from 636 is used to update the mailers address data base and the process continues to decision block 622.

Various software is suitable for use in the above process. One example is the AddressRight software marketed by, Pitney Bowes. Another example is the software program entitled Dazzle marketed by Envelope Manager Software. DAZzle Version 2.0, Copyright 1992–1993, Envelope Manager Software, 247 High Street, Palo Alto, Calif. 94301-1041. This Microsoft Windows based program deals with completing envelope layout and printing including address verification and barcode printing including barcode for the gateway for airport locations for overseas mail.

It should also be recognized that the present system described above maybe integrated with a plurality of different carriers such that in a single communications process tokens can be received and separately sorted for various carriers such as the United States Parcel Service, Federal Express, the United States Postal Service, United Kingdom Royal Mail, DHL and Airborne and the like. Moreover, the data center providing the digital tokens may process the request to identify the most suitable service to meet the requirements of the mailer. This may be based on mailing cost, delivery time, mail or parcel type or size, destination being served, insurance and the like.

Figure 7A:
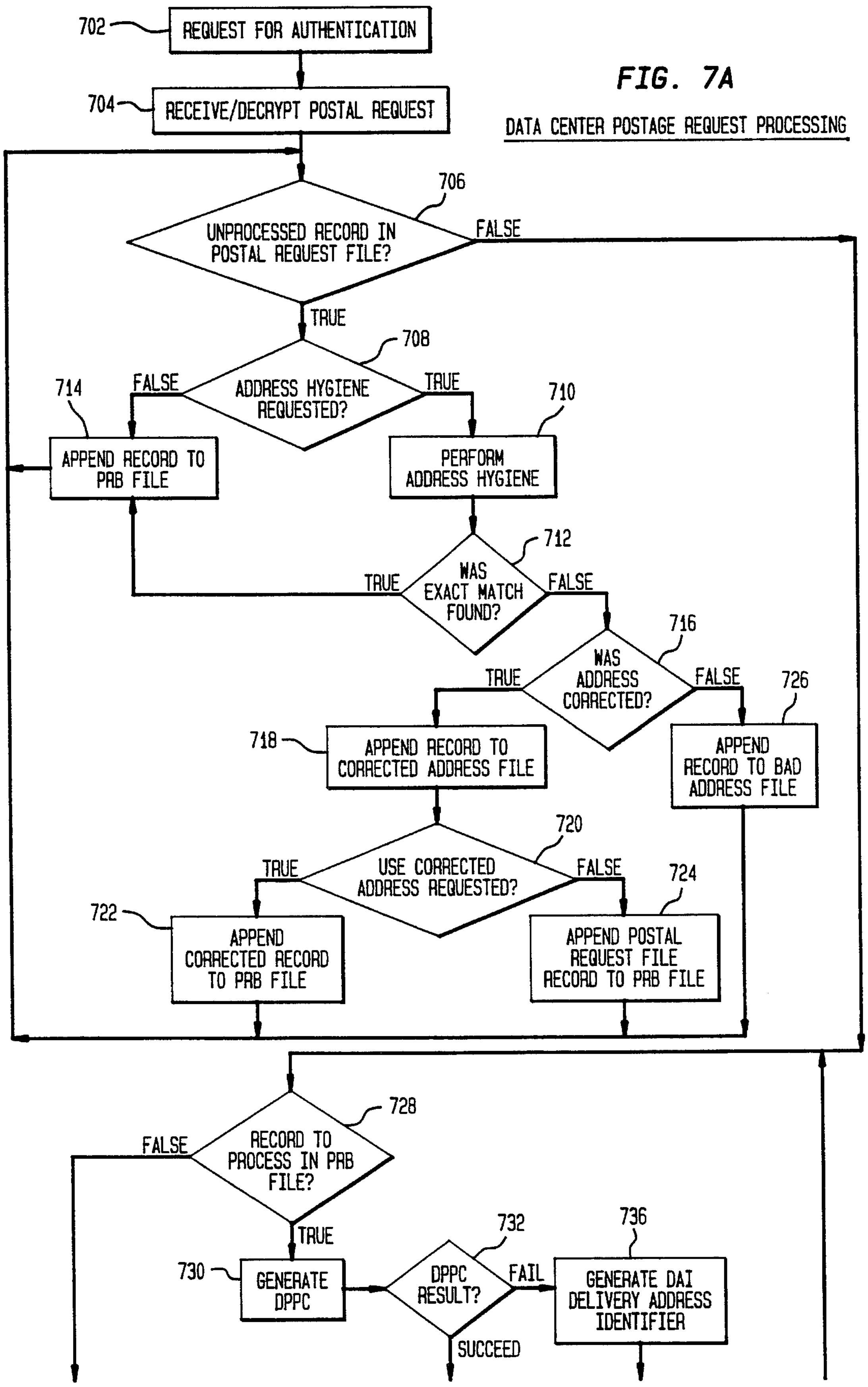
FIG. 7 is flow chart of the operation of the data center shown in FIG. 4.

Reference is now made to FIG. 7 which is a flow chart of the operation of the data center shown in FIG. 4. At 702 a request is received to authenticate a mailer. The authentication process ensures that the data center is in communication with a specific known mailer and uses conventional techniques to authenticate the party with whom the data center is communicating. The data center then receives and decrypts the postal request file at 704 and a determination is then made at 706 if there is an unprocessed record in the postal request file. If so, a decision is then made at 708 if the address hygiene has been requested by the mailer. If so, address hygiene is performed at 710 and thereafter a determination is made at 712 if an exact match was found for the particular record in the file being processed. If this occurs, the data center at 714 appends the record to the postal revenue block file that an exact match was found in the process and loops back to decision block 706 to process the next record. The process continues again at block 708 and if, for example, the next record is a record where address hygiene has not been requested the flag indicates that fact would be appended to the record in the postal revenue block file. The entire record may be appended to the record in the postal revenue block file using the address as provided by the mailer at block 714.

If at block 712 an exact match was not found as part of the address hygiene process, a determination is made at 716 whether the address was corrected as part of the address hygiene process at 710. If this is true, the indication of this fact is appended to the corrected address file at 718. A further determination is made at 720 whether the mailer has requested to use the corrected address in generating the digital token. If so, at 722 the corrected address record is appended to the postal revenue block file. If on the other hand, the mailer had determined at 720 not to use the corrected address file, the postal request file is appended to the postal revenue block file at 724 to be used in the generation of the digital tokens.

If at 716 if the address was not corrected, the record is appended to the bad address file at 726 and no digital token will be generated for this address. Thus, if address hygiene was requested by the mailer and the data center was unable to correct address hygiene and conduct the particular address involved, no digital token is generated. This fact is noted in the bad address file for later action by the mailer and no funds are withdrawn for this particular mailpiece. After decision block 76 determines that there are no further unprocessed records in the postal request file, the process continues to proceed to generate digital tokens.

At 728 a determination is made if there is a record to process in the postage revenue block file. If this is true, a delivery point postal code is generated at 730. In the United States this delivery point postal code is the 11 digit code. Specifically, it is a unique address identifier. The delivery point postal code is an identifier which is unique to each address and as noted above is an example of a delivery address identifier. If the delivery point postal code is successfully generated as determined at 732, the rating process is performed at 734. This generates the proper required amount of postage for the mailpiece involved. An example of the type of rating process and procedure which could be used is described in the above-identified pending U.S. Patent Application for POSTAL RATING SYSTEM WITH VERIFIABLE INTEGRITY. Other forms of rating processes may also be suitably employed. If at 732 a delivery point postal code has not been successfully generated, at 736 a delivery address identifier is generated and thereafter the rating process proceeds at 734.

At 738 an assembly is made of the digital token transformation input data which may include the postage amount; the date of submission; delivery address identifier or delivery point postal code as the case may be; piece count; mailer identification data; and, origination identifier (such as origination zip code).

The generation of a digital token can use many different forms of input data to create a digital token to ultimately be printed on a mailpiece. The particular organization and nature of the input data and the transformation involved is a matter of the requirements of the mailer, the carrier and the level of security desired. At 740 the digital token transformation is performed to generate the vendor digital token and at 742 the postal service digital token transformation is performed to generate the postal service or carrier service digital token.

The digital token transformation at 742 is a second digital token transformation. This digital token transformation utilizes the postal service or courier service black box at the data center (see block 420 in FIG. 4). Moreover, the transformation process and the algorithms involved can be different in the transformations at 740 and 742. Each is separately selected. The vendor selects the particular transformation at 740 subject to various regulations of the carrier service. The carrier selects the transformation of 742 to meet its requirements. At the data center, because of the security of the postage security device 420 which is not accessible to data center personnel or only to limited authorized data center personnel, the vendor has the ability to generate the postal service or carrier digital token without knowing the precise transformation involved.

An error control code is generated at 744 and appended to the string of data. This is provided to effectuate high speed accurate automatic data capture, and processing where error control codes are normally employed to detect and correct the corruption of data. The error control code is utilized at later date when scanning the string of data to ensure the data has been scanned properly or keyed in properly. It is used in standard fashion to verify the integrity of the process of the data entry. The data center at 746 accounts for the postage and generates accounting record and charges the postage to the mailers account. This may also involve the transfer of funds from one account to another account, such as from the mailers account to the carriers account, or through intermediary accounts such as a trustee account to the carrier account. At 748 the postal revenue block file is appended to it include the following data: the postage date of submission; delivery address identifier or delivery point postal code, as the case may be; piece count; mailer identifier; origination zip code; vendor digital token; postal service and/or carrier digital token; and, error control code. Again as noted above, the selection of the particular data and the manner in which its processed and organized is subject to meeting the requirements of the particular system involved. A mailing run identifier for the particular mail run may also be included.

The above process continues until it is determined at 728 that there are no more records in the postal revenue block file to be processed. At this time, at 750, the postal revenue block file, corrected address file, bad address file and accounting record are encrypted and at 752 transmitted to the mailer. A copy of the message transmitted to the mailer is stored at the data center for later possible retransmission and/or statistical analysis and/or later audit. Depending on the requirements of the system the storage can be temporary and/or permanent.

Figure 8:
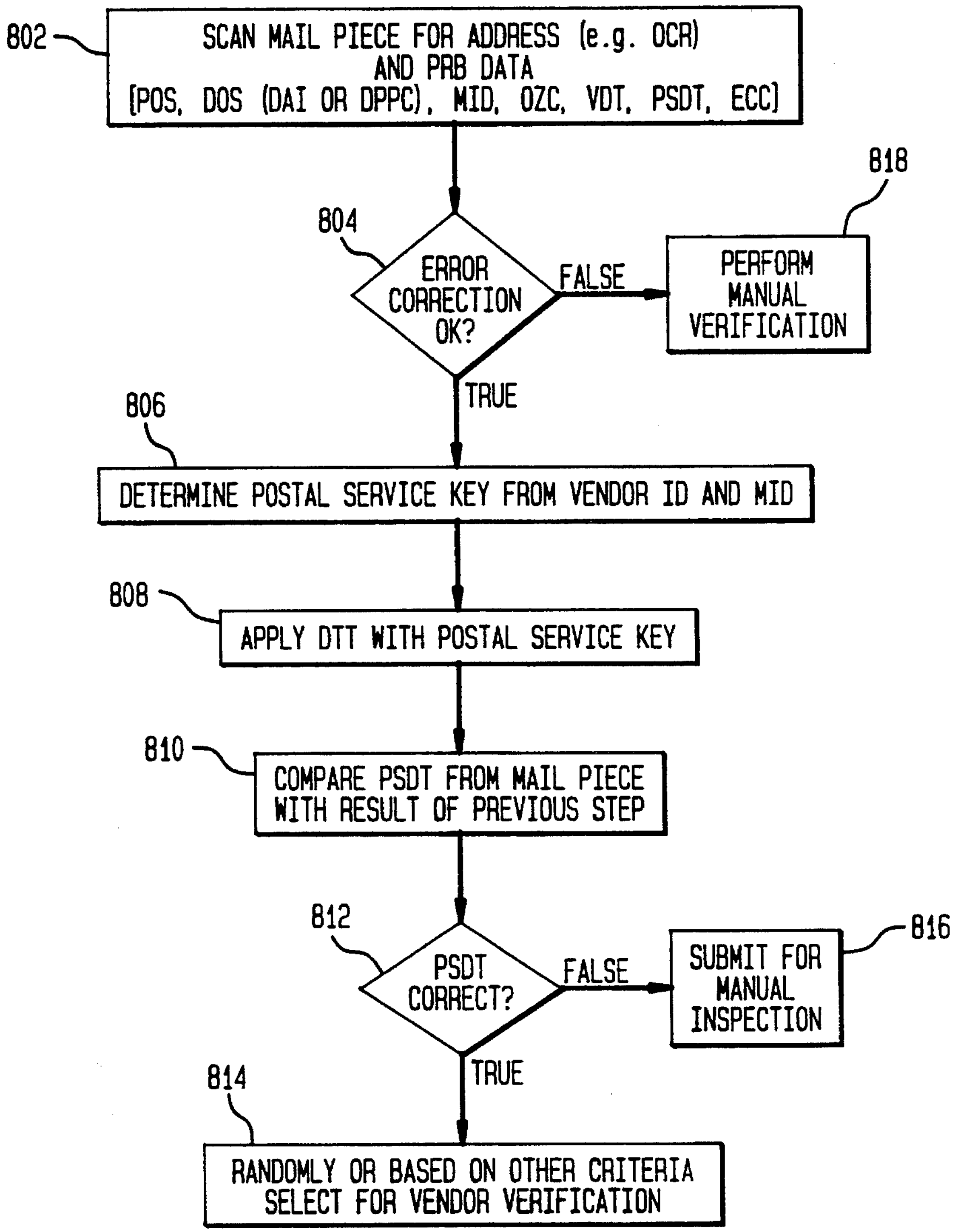
FIG. 8 is a flow chart of the verification process for the verification authority system shown in FIG. 5.

Reference is now made to FIG. 8 which is a flow chart of the verification process for the verification authority system shown in FIG. 5. Each received mailpiece is scanned at 802 for address and postal revenue block data. The scanning can be done by any suitable means. Examples of suitable scanning systems include hand held scanners and fixed high speed scanners typically employed by postal processing equipment. The scanning can be of alphanumeric data or barcode or other coded printed data depending upon the particular system employed and the requirements of the system. The scanning may be performed by a person reading the data on the envelope and keying it in through a user interface at 504.

The outcome of the scanning at 802 may be an ASCII file, of processible data to be thereafter utilized. A determination is made at 804 as to whether the error correction code appended as shown in FIG. 7 is correct. If it is correct, a determination is made at 806 of the postal service key from the vendor identification and the mailer identification numbers. Thereafter, a digital token is generated with the postal service key at 808 and a comparison is made at 810 between the postal service digital token printed on the mailpiece with the previously generated digital token at 808. The vendor token can be processed in similar manner. Depending on the system, decryption techniques, rather than reencryption techniques may be employed if desired. A determination is made at 812 whether the comparison of the postal service digital token read from the mailpiece and the one generated at 808 compared correctly. If matched, the process continues. It may be desired however at 814 to randomly, or based on other criteria, as for example, level of usage of a particular mailer, destination, density for mailpieces and the like, or profile of the mailer, select mailpieces for vendor verification by comparing the vendor digital token with the vendor digital token printed on the mailpiece. If it is determined at 812 that a match did not occur, the mailpiece is outsorted for manual inspection at 816. It should be recognized first if at 804 the error correction code did not verify as correct, the process may either be stopped or a manual inspection may be conducted at 818. The vendor digital token may be also processed in a similar manner.

As previously noted, an alternate embodiment of the metering system shown and described in connection with FIGS. 1 and 3 through 7 is shown in connection with FIGS. 9 through 14. This embodiment in FIGS. 9 through 14 is suitable for use in a network environment. To a large extent, similar reference numerals are used (other than the first digit for FIGS. 1 through 9 and the first two digits for FIGS. 9 through 14) in FIGS. 9 through 14 to designate similar system elements as designated in FIGS. 1 and 3 through 7. The similar structure operates in a similar manner and will not be described again in detail.

Figure 9:
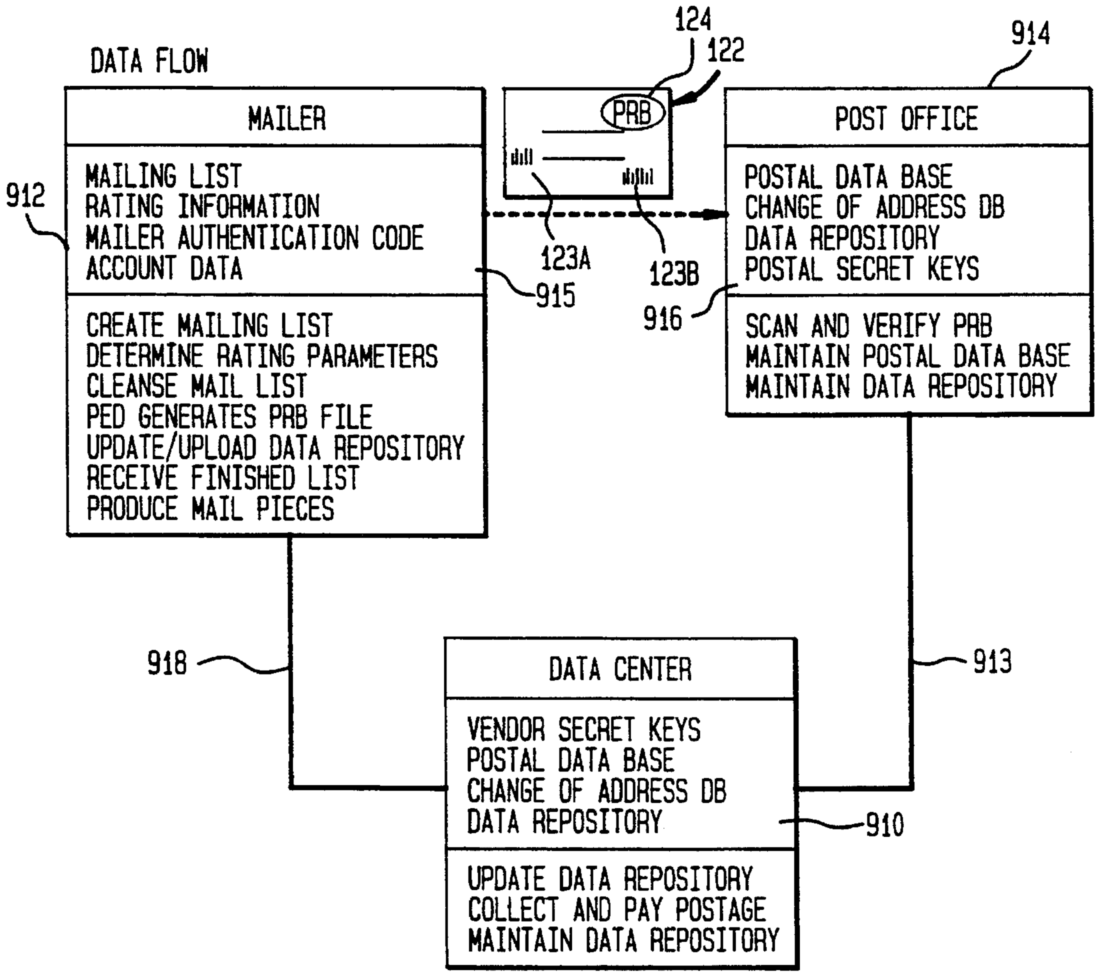
FIG. 9 is an architecture of an alternate embodiment of the metering system shown in FIG. 1 suitable for use in a network environment.

Reference is made to FIG. 9. The division of function between the mailer unit 912 and data center 910 is modified since the digital tokens are now generated at the mailer facility. Thus, the functions of updating the data repository and the new function of uploading the data repository information are incorporated in the mailer unit 912 as well as cleansing the mailing list and generating the postage revenue block file. The function in the mailer unit of encrypting and sending the postal revenue request file to the data center is no longer required and has been eliminated. This is because, as will be apparent in FIG. 10, a secure postage evidencing device is provided at the mailer facility on the mailer network. Encryption, however, if desired can still be employed for communications on the mailer network as an option to the mailer for security purpose.

Figure 10:
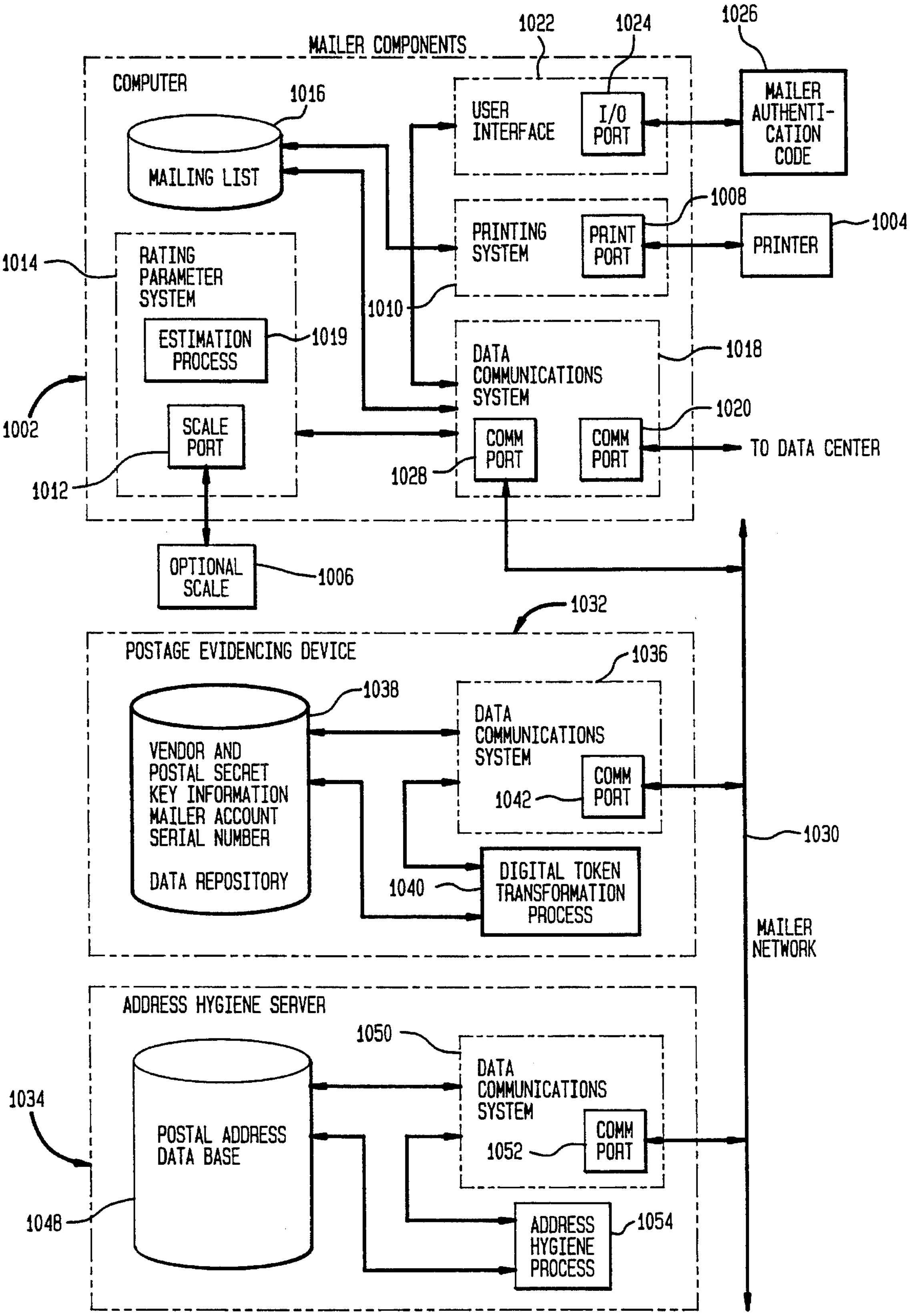
FIG. 10 is a diagrammatic representation of a mailer unit coupled to a network system along with other necessary components for metering postage.

Reference is made to FIG. 10 which is a diagrammatic representation of a mailer unit coupled to a network system along with the other necessary components for metering postage. The mailer unit 1002 is connected through a communications port 1028 to a mailer network 1030. The mailer network 1030 may be a local area network. It may be a wireless or a wired network. It may be a telephone network or other suitable communication system to allow communication between the various mailer components.

Connected to the mailer network are a postal evidencing device shown generally at 1032 and an address hygiene server or device shown generally at 1034 these devices 1032 and 1034 function to provide the necessary functions of the data center shown in FIG. 4; however, the secure postage evidencing functions are embodied in the postage evidencing device 1032 while the address hygiene functions are embodied in the device 1034. The address hygiene functions of device 1034, may be, if desired, incorporated in the postage evidencing device 1032 or in the mailer unit 1002 or even left at the data center or another remote facility.

The postage evidencing device 1032 includes a data communications system 1036 connected to a data storage device 1038 which includes various information in addition to information received from the mailer unit 1002 over the network 1030. Included in the storage device 1038 are: vendor and postal secret key information; data repository which would include information transmitted by the mailer unit 1002; and, mailer account information which may also include information transmitted by the mailer and serial number. The data repository and mailer account information may include, similar to FIG. 4 accumulated data and other data stored by the data center relevant to various transactions associated with the mailer. The memory 1038 is a secure tamper resistant memory and the entire postage evidencing device may be secured in a separate secure location within the mailer facility or to a remote mailer facility on the mailer network.

A digital token transformation processing device 1040 is provided. The data from the memory 1038 along with appropriate data from the mailer unit 1002 and the and/or the address hygiened server 1034, are processed in the digital token transformation processing device 1040. The digital tokens are communicated via a communication port 1042 in the data communication system to the mailer unit 1002 to be utilized in the manner previously described. The network secure memory device 1038 contains the vendor secret key and the Post Office secret key assigned to the network postage evidencing device 1032 for production of digital tokens. There is not Post Office security device in the network system corresponding to data center Post Office security device 420 in FIG. 4. In the case of the data center system, the data center contains sufficient information for a forger to imitate all mailers using the data center, and thus it is important for the Post Office to maintain security independent of the vendor to assure the integrity of the system. In the case of the network system the postage evidencing device contains only sufficient information to imitate itself, and so there is no advantage significant to maintaining the vendor secret key and the Post Office secret key in separate secure devices.

The address hygiene server 1034 includes a memory 1048 having the postal address database stored therein. The storage device 1048 is connected through the communication port 1052 of the data communications system 1050 to the network 1030. The address information is received via the network and the communication port 1052 which is thereafter flowed into the memory 1048 for processing in the address hygiene process device 1054. Hygiened address information is communicated via the communication port 1052 and the network 1030 to the postage evidencing device 1038 and to mailer unit 1002.

Figure 11:
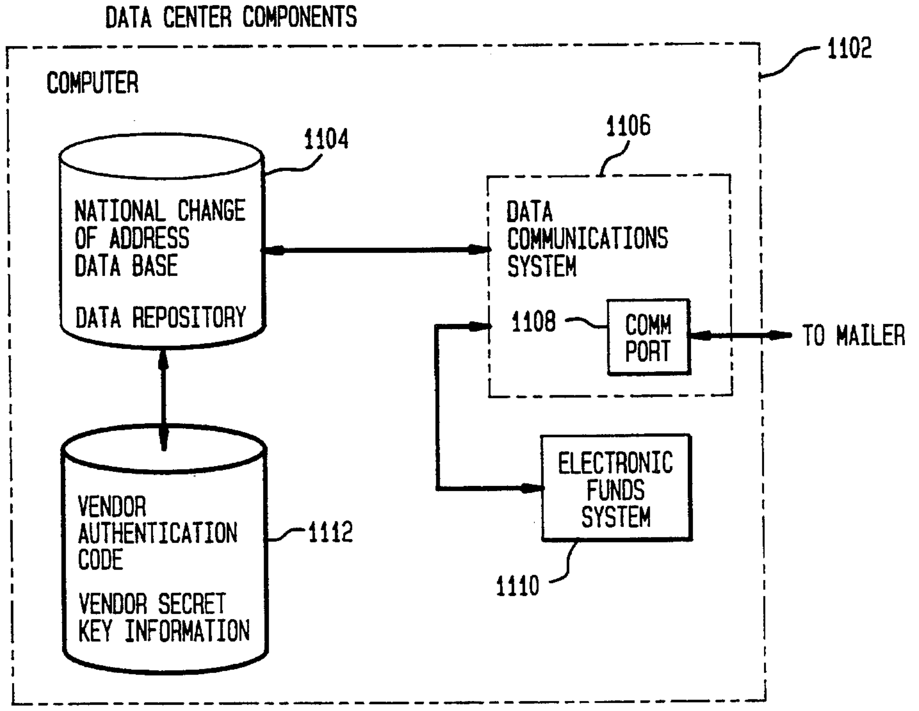
FIG. 11 is a diagrammatic representation of a data center suitable for operation with the mailer unit and network arrangement shown in FIG. 10.

Reference is now made to FIG. 11 which is the diagrammatic representation of the data center suitable for operation with the mailer unit and the network arrangement shown in FIG. 10. Data center shown generally at 1102 includes a memory 1104 containing the national change of address database and the data repository. The memory 1104 is connected to the mailer unit 1002 via a data communication system 1006 having a communication port of 1108. The memory 1104 includes the information which is uploaded to the mailer facility 912. The data center may include an electronic funds system 1110 which functions similarly to the electronic funds transfer system 518 shown in FIG. 5. This is to denote that the electronic funds transfer system may be part of the data center as opposed to or in addition to the post office system. Thus, where the electronic funds accounting and transfer occurs at the data center, this information is communicated to the mailer and to the post office. When as in FIG. 5, the electronic funds system is at the post office, the accounting information is communicated from the post office to the mailer through the data center.

A secure memory 1112 is also provided at the data center 1102. The secure memory stores vendor authentication code; vendor secret key information; and postal secret key information, if desired. The secure memory 1112 may be a portion of the memory 1104 or a separate secure memory in a tamper resistant housing.

Figure 12:
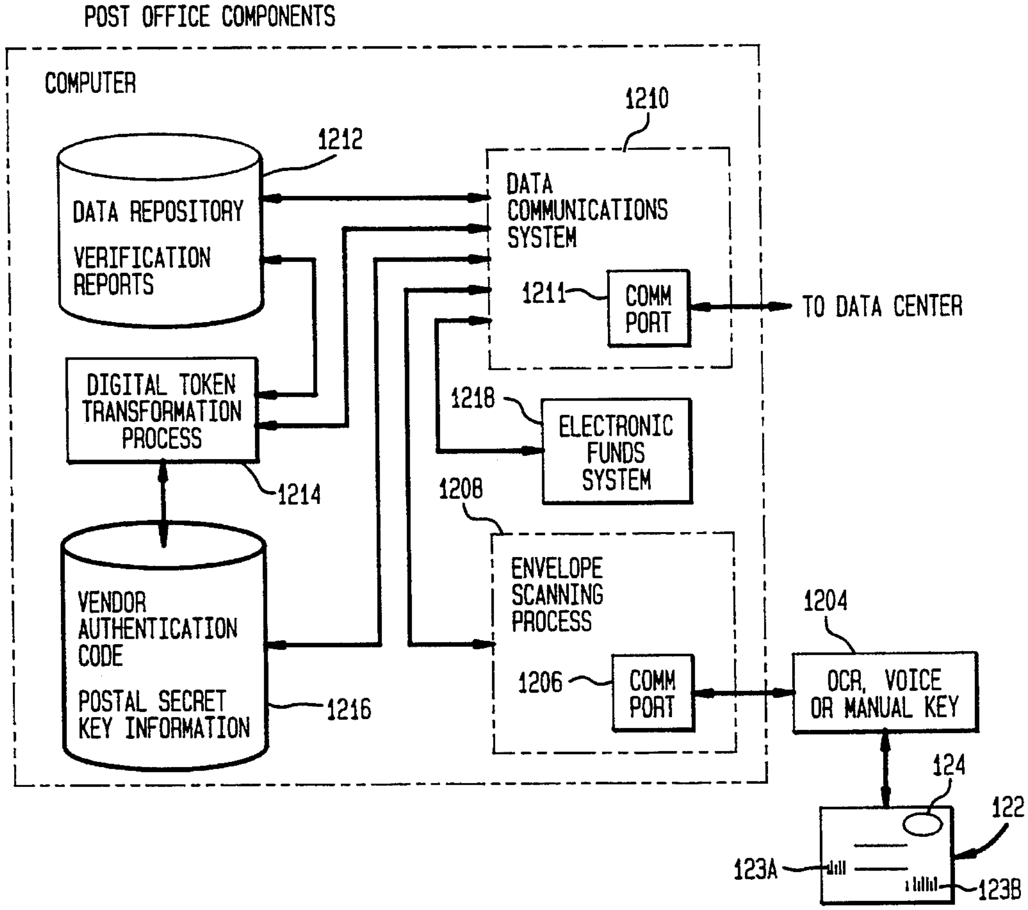
FIG. 12 is a diagrammatic representation of a post office for verification of mailpieces suitable for use with the network arrangement shown in FIGS. 10 and 11.

Reference is now made to FIG. 12 which is a diagrammatic representation of a post office system suitable for work with the network arrangement. The post office 1202 includes a memory 1212 containing the data repository and verification reports. Additionally stored, if desired, is of the additional information shown in the memory 512 of FIG. 5. However, the postal address database and national change of address database can be stored if desired, at the address hygiened server 1034 or at the data center 1102. The post office system shown in FIG. 12 functions in the same manner as that shown in FIG. 5 to authenticate and verify payment of postage for various mailpieces delivered by mailers to the post office.

Figure 13:
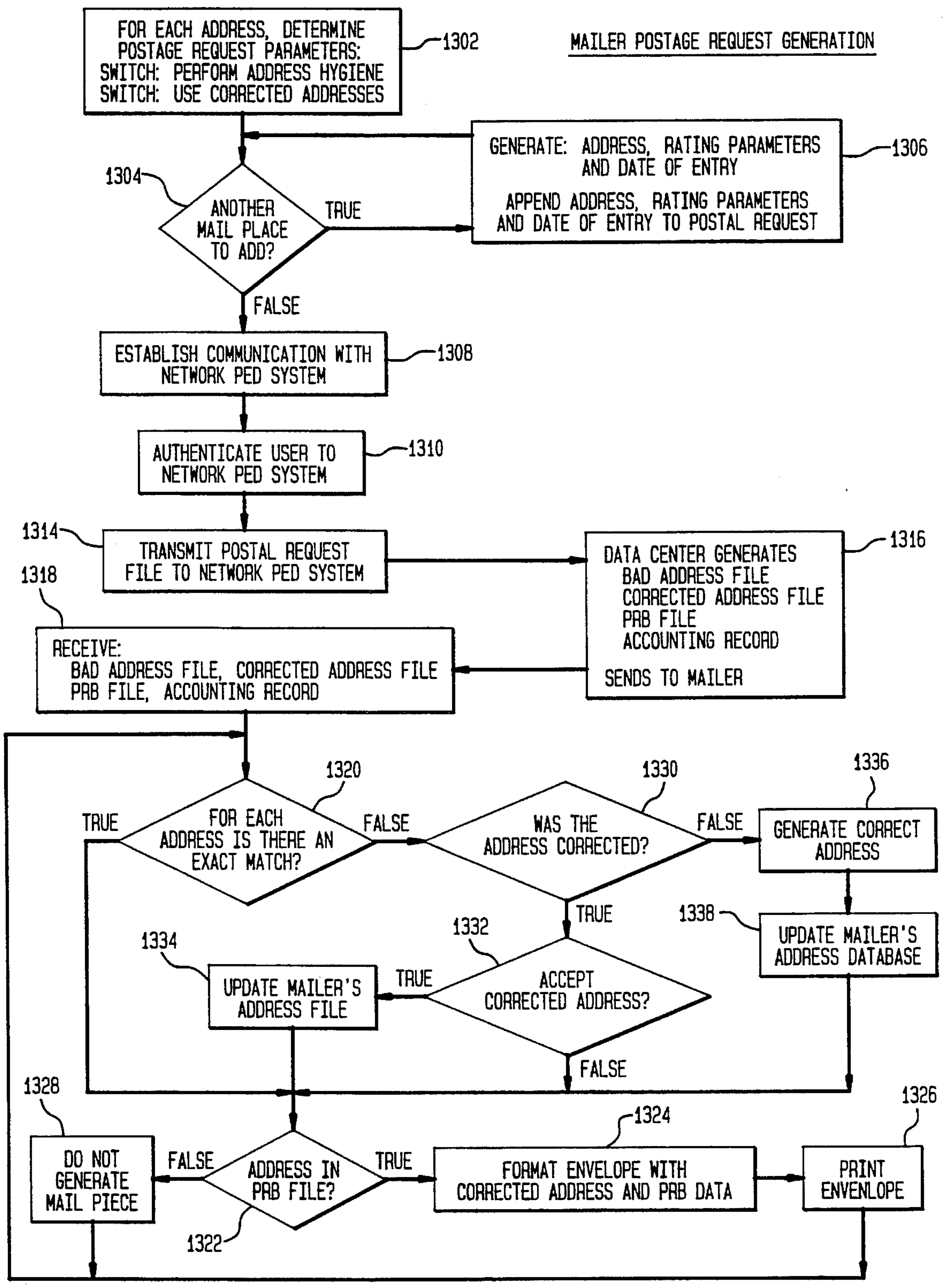
FIG. 13 is a flow chart of the mailer and network arrangement shown in FIG. 10.

Reference is now made to FIG. 13. As can be seen by a comparison of FIG. 13 AND FIG. 6, the flow of the operation of the mailer facility is very similar to the mailer unit; however, communication is established with the network postage evidencing system at 1308 and the postage evidencing system functions in much the same way as the data center functions in the non network system shown in FIGS. 1 through 8.

Figure 14A:
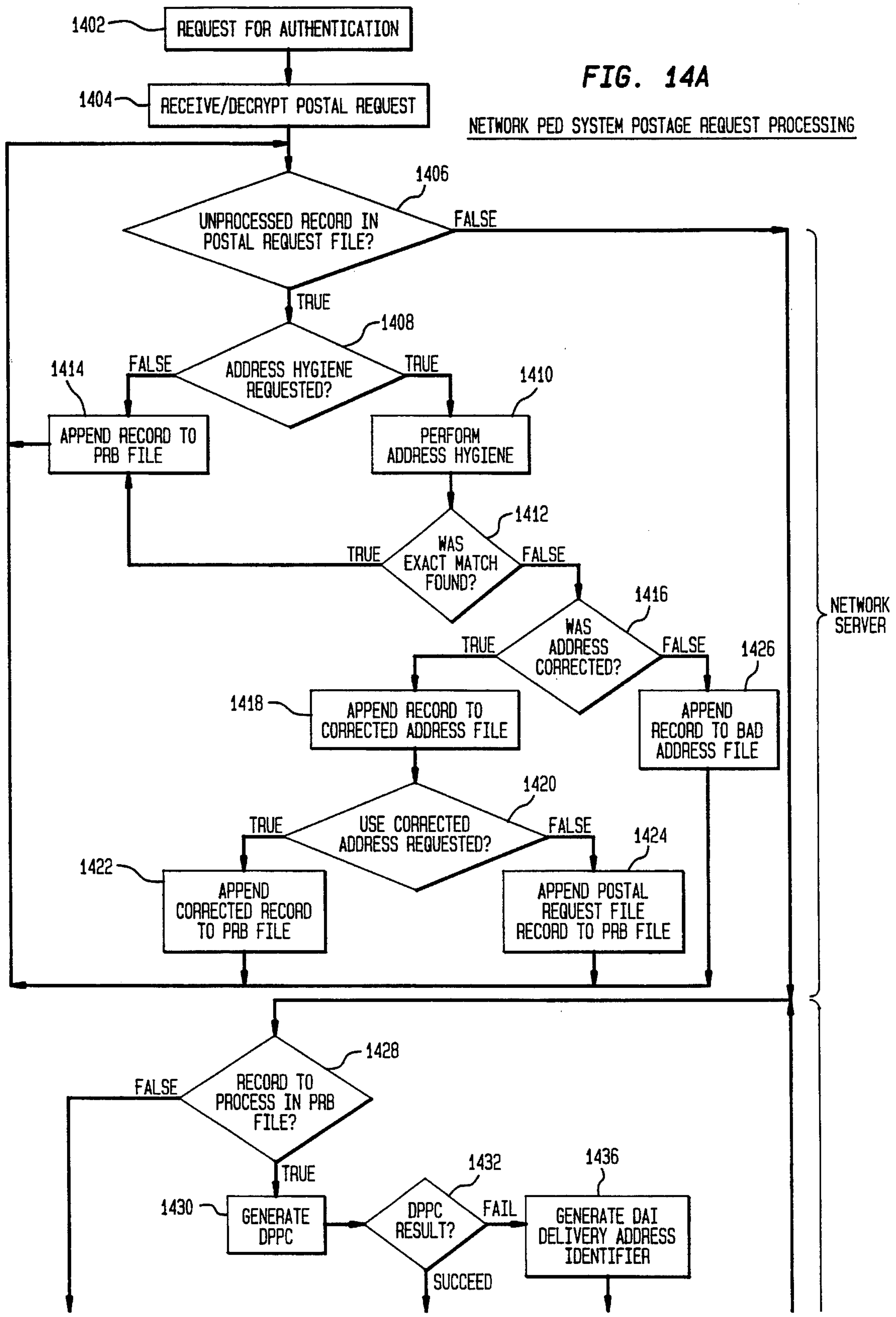
FIG. 14 is a flow chart of the network postage evidencing device system for the network server shown as part of FIG. 10.

Reference is now made to FIG. 14. As can be seen by a similar comparison of FIG. 13 and FIG. 7, the postage evidencing system on the network processes requests in a similar manner as the data center shown in FIG. 7 processes requests. The functionality, however, is divided between address hygiene server 1034 and the postage evidencing device 1032.

It should be noted that the above described system provides numerous benefits to the mailer, the data center and the post office. The benefits include:

For the mailer:

1) Accurate funds tracking for multiple accounts.
2) Automatic access to centralized address information, including frequently updated change of address information.
3) A majority of communication between mailer, data center and a carrier can be made totally transparent to communicating parties by employing electronic data interchange methods.
4) Confidentiality and authenticity of all sensitive information can be protected.

5) A low cost effective mailpiece preparation solution for mailer is provided.

6) Convenient access to postage payment is provided.

7) The data center may provide for additional information or control of job run and other scheduling for optimization of delivery time and mailing costs based on postal network information.

8) The data center can provide various different and/or similar services through alternative carriers for special services and packages.

9) The data center can provide customized mailing lists both nationally and internationally based on market demographics.

10) Data Center can provide distributed hybrid mail the data center may also be a mail center which can generate the physical mail for the mailer, close to physical delivery addresses.

11) The systems conform to and are compatible with computer networked based business operations.

12) A single device solution is provided for a mailer's facility using local area network arrangements such as, for example campus, metropolitan area, geographic area or company using corporate or other network arrangements.

For the Data Center:

1) Secret encryption key management is much more effective.

2) Access is provided to customers mailings for marketing and usage information.

3) Ability is provided to to monitor mailing frequency and geographic distribution.

4) The data center can provide evidence of authenticity of payment or data for other applications.

5) A single point of contact is provided for distribution services to mailer.

6) data repositories.

For the Post Office (or other carrier):

1) High quality addresses give mail is generated which is suitable for automated processing from small and intermediate size mailers. The cost of mail distribution is therefor reduced.

2) The quality of information for verification is much higher.

3) The postal service burden for implementation may be minimal and is facilitated. The format of all communications between vendor and post office are predefined by the interface.

4) Access to summary information of system use provides a guide for sampling and verification.

5) A way is enabled to provide special discounts and customized rates for mailers.

6) A natural and significantly simplified way is enabled to provide special services such as certified, registered, international and overnight mail for mailers.

6) Provides a planning tool for new services and facilities for small and medium size mailers.

It should be recognized that some of the benefits are more particularly found in the network embodiments disclosed above as opposed to the non-network embodiments. Specifically, the network postage evidencing device systems described may, in certain instances be better suited to particular mailing applications as opposed to the non-network systems. For example, the non-local area network system may be better suited to fit batch mailers will regular planned mailings who wish to directly interact with a central data center and/or post office and/or carrier, rather than conduct internal accounting. On the other hand, the network avoids the need to provide modems and telephone lines for each mail generation station or for multiple mail generation stations. Moreover, access to an electric data interchange may be expensive.

Telephone line charges may have a fixed cost that would be shared over the total number of tokens processed for a small number of digital tokens, this may be expensive. The network systems and method on the other hand, may best fit businesses with less periodic smaller mailings or several mail generation stations. Other consideration include that computer networks can provide a direct high-speed link to a network postage evidencing device for mail generation stations. The cost of network attachment would be shared with all other network based activities. Network devices, in certain situations, may better fit high volume mailers with large token processing requirements. An additional factor that may involve the selection and design of the particular system, is the bandwith of the system itself or the communication requirements which may include issues such as, performance requirements and centralized distribution at the mailers site.

It should be recognized that all of the above factors are simply considerations which may cause an individual mailer to select one particular approach over another. However, either approach would be satisfactory to solve any mailer requirements and may be dictated by external factors such as requirements of the carrier service involved and the availability of hardware, communications, and software.

While the present invention has been described with reference to the specific embodiments, it is apparent that many variations and modifications may be made to these various embodiments. It is thus intended in the following claims to cover each variation and modification that falls within the true spirit and scope within the present invention.

What is claimed is:

1. A method for preparing mailpiece comprising the steps of:

creating a mailing list for a plurality of mailpieces, said mailing list including mailpiece recipient address information for each mailpiece of said plurality of mail pieces, said mailing list including correct recipient address information and incorrect recipient address information;

transmitting said mailing list to a data center; and, receiving from said data center a mailing list including address hygiened recipient address information for mailpieces in said transmitted mailing list with incorrect recipient address information and a digital token for each mail piece of said plurality of mail pieces, each of said digital tokens including encrypted information for each mail piece of said plurality of mail pieces based on said correct address information for mail pieces with correct address information on said transmitted mailing list and on hygiened recipient address information for mail pieces with incorrect recipient address information on said transmitted mailing list.

2. A method as defined in claim 1 further comprising:

printing said mail pieces with said correct recipient address information, said hygiened recipient address information and said digital tokens.

3. A method as defined in claim 1 further comprising:

encrypting said mailing list for transmission to said data center and wherein said transmitted mailing list is said encrypted mailing list.

4. A method as defined in claim 1 further comprising:

said mailing list received from said data center being an encrypted mailing list with said hygiened recipient address information encrypted and said digital token further encrypted; and, decrypting said received mailing list to obtain unencrypted hygiened recipient address information for incorrectly addressed mail pieces of said plurality of mail pieces and said digital tokens including encrypted information based on said correct address information for mail pieces with correct address information on said transmitted mailing list and on hygiened recipient address information for mail pieces with incorrect recipient address information on said transmitted mailing list.

5. A method as defined in claim 1 further comprising:

encrypting said mailing list for transmission to said data center and wherein said transmitted mailing list is said encrypted mailing list;

said mailing list received from said data center being an encrypted mailing list with said hygiened recipient address information encrypted and said digital token further encrypted; and, decrypting said received mailing list to obtain unencrypted hygiened recipient address information for incorrectly addressed mail pieces of said plurality of mail pieces and said digital tokens including encrypted information based on said correct address information for mail pieces with correct address information on said transmitted mailing list and on hygiened recipient address information for mail pieces with incorrect recipient address information on said transmitted mailing list.

6. A method as defined in claim 2 further comprising printing said recipient address information in machine readable format on said mail piece.

7. A method as defined in claim 1 further comprising receiving said transmitted mailing list at said data center and accounting for the value authenticatable by the digital tokens.

8. A method as defined in claim 2 further including the steps of monitoring digital token use and where the digital token is not utilized, transmitting to said data center information concerning said digital tokens not utilized.

9. A method as defined in claim 8 further comprising storing at said data center information concerning digital tokens for each mailing list and also storing at said data center information concerning said transmitted information concerning said digital tokens not utilized.

10. A method as defined in claim 9 further comprising accounting at the data center for digital tokens provided for each mailing list.

11. A method as defined in claim 10 further comprising accounting for said digital tokens not utilized.

12. A method as defined in claim 1 further comprising maintaining at said data center a repository of data regarding each mailing list and the particular mailer associated with generating the mailing list.

13. A method as defined in claim 8 further comprising storing at a mailer facility associated with the generation of the mailing list said information concerning digital tokens for each mailing list and also storing at the data center said information concerning said digital tokens not utilized.

14. A method as defined in claim 1 wherein said mailing list includes mail pieces with recipient address information not susceptible to address hygiene and further comprising receiving address identifier data for such mail pieces.

15. A method as defined in claim 1 wherein said mailing list includes mail pieces with recipient address information not susceptible to address hygiene and further comprising receiving a recipient address mail piece identifier for each such mail piece said digital token for each such mail piece based on said identifier data.

16. A method as defined in claim 1 further comprising:

authenticating the transmitter of said mailing list to said data center.

17. A method as defined in claim 1 further comprising:

receiving authentication of said data center.

18. A method for preparing mail pieces comprising the steps of:

creating a mailing list for a plurality of mail pieces, said mailing list including mail piece recipient address information for each mail piece of said plurality of mail pieces, said mailing list including correct recipient address information and incorrect recipient address information;

determining rating parameter information for each of mail pieces of said plurality of mail pieces, said rating parameter information constituting the basis upon which the charges for mail piece delivery is calculated;

transmitting said mailing list and said rating parameter information to a data center; and, receiving from said data center a mailing list including address hygiened recipient address information for mail pieces in said transmitted mailing list with incorrect recipient address information and a digital token for each mail piece of said plurality of mail pieces, each of said digital tokens including encrypted information encrypted information for each mail piece of said plurality of mail pieces based on both the rating parameter information and said correct address information for mail pieces with correct address information on said transmitted mailing list and on hygiened recipient address information for mail pieces with incorrect recipient address information on said transmitted mailing list.

19. A method as define in claim 18 further comprising:

printing on said mail pieces said correct recipient address information, said hygiened recipient address information, said digital tokens and said rating parameter information.

20. A method as defined in claim 18 further comprising:

encrypting said mailing list for transmission to said data center and wherein said transmitted mailing list is said encrypted mailing list;

said mailing list received from said data center being an encrypted mailing list with said hygiened recipient address information encrypted and said digital token further encrypted; and, decrypting said received mailing list to obtain unencrypted hygiened recipient address information for incorrectly addressed mail pieces of said plurality of mail pieces and said digital tokens including encrypted information based on said transmitted rating parameter information and said correct address information for mail pieces with correct address information on said transmitted mailing list and on hygiened recipient address information for mail pieces with incorrect recipient address information on said transmitted mailing list.

21. A method for preparing mail pieces comprising the steps of:

generating recipient address information for said mail pieces, said recipient address information including incorrect recipient address information;

generating corrected recipient address information for said incorrect recipient address information;

applying a selected one of said incorrect recipient address information and said corrected recipient address information to an encrypter;

generating encrypted data by said encrypter based on said selected one of said incorrect recipient address information and said corrected recipient address information; and, placing said encrypted data on said mail piece.

22. A method as defined in claim 21 further comprising placing on said mail piece said selected one of said incorrect recipient address information and said corrected recipient address information.

23. A method as defined in claim 22 wherein said encrypted data and said selected one of said incorrect recipient address information and said corrected recipient address information is placed on said mail piece in machine readable form.

* * * * *